(12) United States Patent
Clarkin et al.

(10) Patent No.: US 9,787,179 B1
(45) Date of Patent: Oct. 10, 2017

(54) APPARATUS AND METHODS FOR CONTROL OF DISCONTINUOUS-MODE POWER CONVERTERS

(71) Applicant: Picor Corporation, North Smithfield, RI (US)

(72) Inventors: John P. Clarkin, Coventry, RI (US); Jeffrey Bruce Van Auken, Littleton, MA (US)

(73) Assignee: Picor Corporation, North Smithfield, RI (US)

( * ) Notice: Subject to any disclaimer, the term of this patent is extended or adjusted under 35 U.S.C. 154(b) by 105 days.

(21) Appl. No.: 13/794,588

(22) Filed: Mar. 11, 2013

(51) Int. Cl.
  *H02M 3/158* (2006.01)
  *H02M 3/156* (2006.01)
  *G05F 1/40* (2006.01)
  *G05F 1/10* (2006.01)

(52) U.S. Cl.
  CPC .............. *H02M 3/156* (2013.01); *G05F 1/10* (2013.01); *G05F 1/40* (2013.01); *H02M 3/158* (2013.01)

(58) Field of Classification Search
  CPC .................................. H01F 17/04; G05F 1/40
  USPC ....... 323/222, 271, 282, 284, 371, 283, 285, 323/273
  See application file for complete search history.

(56) References Cited

U.S. PATENT DOCUMENTS

| | | | |
|---|---|---|---|
| 3,119,972 | A | 1/1964 | Fischman |
| 3,259,829 | A | 7/1966 | Feth |
| 3,529,228 | A | 9/1970 | Cordy |
| 3,543,130 | A | 11/1970 | Reijnders |
| 3,582,754 | A | 6/1971 | Hoffmann et al. |
| 3,621,362 | A | 11/1971 | Schwarz |
| 3,663,940 | A | 5/1972 | Schwarz |
| 3,953,779 | A | 4/1976 | Schwarz |
| 4,007,413 | A | 2/1977 | Fisher et al. |

(Continued)

FOREIGN PATENT DOCUMENTS

| | | |
|---|---|---|
| DE | 2218055 | 10/1973 |
| DE | 2756799 | 6/1978 |

(Continued)

OTHER PUBLICATIONS

EPO Communication, Decision of Rejection, Application No. EP 02252652.9, Mar. 3, 2005, 7 pages.

(Continued)

*Primary Examiner* — Jue Zhang
*Assistant Examiner* — Trinh Dang
(74) *Attorney, Agent, or Firm* — Fish & Richardson P.C.

(57) ABSTRACT

A switching power converter comprising an inductor and one or more switches and configured to operate in a discontinuous operating mode comprises a clamp circuit connected to the ends of the inductor for trapping energy in the inductor during a clamp period. The clamp circuit comprises a first and a second clamp switch connected in series, the clamp circuit arranged and configured to block a voltage of either polarity when both switches are OFF; conduct a current of either polarity when both switches are ON; conduct unidirectionally in one direction when one of the clamp switches is ON; and conduct uni-directionally in the other direction when the other one of the clamp switches is ON. A controller turns the one or more switches ON and OFF to transfer energy from the input to the inductor and from the inductor to the output during an energy transfer phase.

28 Claims, 15 Drawing Sheets

(56) References Cited

U.S. PATENT DOCUMENTS

| | | |
|---|---|---|
| 4,017,784 A | 4/1977 | Simmons et al. |
| 4,024,453 A | 5/1977 | Corry |
| 4,138,715 A | 2/1979 | Miller |
| 4,158,881 A | 6/1979 | Simmons et al. |
| 4,318,164 A | 3/1982 | Onodera et al. |
| 4,415,959 A | 11/1983 | Vinciarelli |
| 5,229,707 A | 7/1993 | Szepesi et al. |
| 5,477,131 A | 12/1995 | Gegner |
| 5,568,041 A | 10/1996 | Hesterman |
| 5,751,565 A | 5/1998 | Faulk |
| 5,841,268 A | 11/1998 | Mednik |
| 5,880,940 A | 3/1999 | Poon |
| 5,977,754 A | 11/1999 | Cross |
| 6,051,963 A | 4/2000 | Eagar |
| 6,100,675 A | 8/2000 | Sudo |
| 6,271,651 B1 * | 8/2001 | Stratakos ............... H02M 3/158 323/282 |
| 6,369,252 B1 | 4/2002 | Akoh |
| 6,469,914 B1 | 10/2002 | Hwang et al. |
| 6,486,645 B1 | 11/2002 | Van Auken |
| 6,522,108 B2 | 2/2003 | Prager et al. |
| 6,577,110 B2 | 6/2003 | Van Auken |
| 6,580,258 B2 | 6/2003 | Wilcox et al. |
| 6,661,679 B1 | 12/2003 | Yang et al. |
| 6,788,033 B2 | 9/2004 | Vinciarelli |
| 6,922,346 B2 | 7/2005 | Wofford et al. |
| 7,154,250 B2 | 12/2006 | Vinciarelli |
| 7,245,113 B2 | 7/2007 | Chen et al. |
| RE40,072 E | 2/2008 | Prager et al. ................. 323/222 |
| 7,427,852 B2 | 9/2008 | Reed et al. |
| 7,456,624 B2 | 11/2008 | Sheng et al. |
| 7,502,235 B2 | 3/2009 | Huang et al. |
| 8,115,460 B2 | 2/2012 | Kalechshtein |
| 2005/0264271 A1 * | 12/2005 | Lam ........................ H02M 1/10 323/282 |
| 2006/0176035 A1 * | 8/2006 | Flatness ................ H02M 3/156 323/282 |
| 2010/0202176 A1 * | 8/2010 | Hallak .......................... 363/131 |
| 2011/0260643 A1 * | 10/2011 | Huang et al. ................. 315/294 |
| 2011/0273151 A1 * | 11/2011 | Lesso ................... H02M 3/158 323/271 |
| 2011/0311027 A1 | 12/2011 | Rexhausen et al. |
| 2013/0141070 A1 * | 6/2013 | Goessling et al. ............ 323/284 |

FOREIGN PATENT DOCUMENTS

| | | |
|---|---|---|
| DE | 2756773 | 7/1978 |
| JP | 636384 | 5/1994 |
| JP | 11127575 | 5/1999 |

OTHER PUBLICATIONS

JPO Communication, Decision for Grant, Application No. JP 2002-111531, Mar. 15, 2005, 2 pages.

EPO Communication, Reversal of Rejection, Application No. EP 02252652.9, Aug. 19, 2005, 1 page.

EPO Communication, llowance including claim amendments, Application No. EP 02252652.9, Jan. 13, 2006, 27 pages.

Maruhashi et al., "A High Power Switching Regulator System Driven by High-Frequency Resonant Thyristor Chopper Circuit", Memoirs of the Faculty of Engineering, Kobe University, No. 22, pp. 99-111, Mar. 1976.

Texas Instruments, "17-V, 1.5-A, Synchronous Step-Down Converter—TPS62110 Datasheet", Jul. 2005, 27 pages.

* cited by examiner

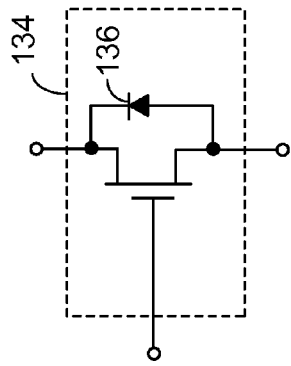
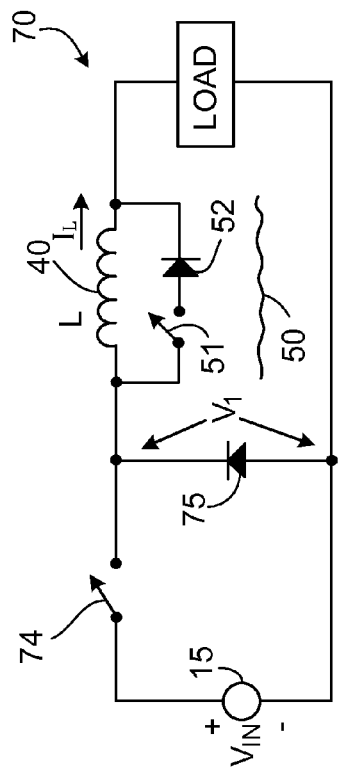
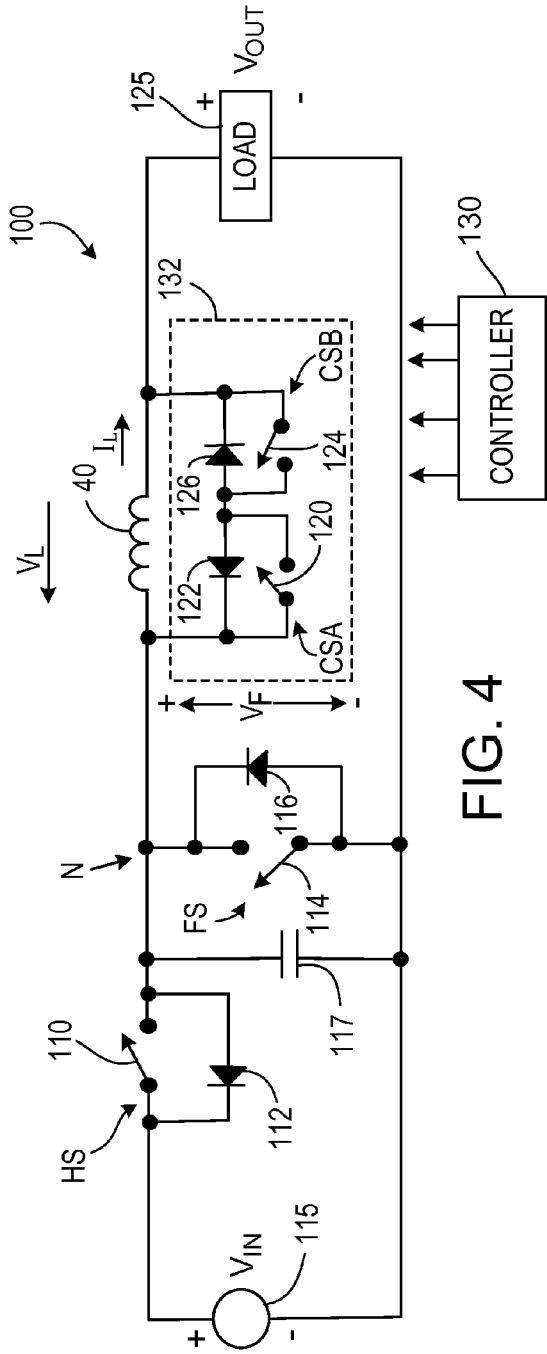
FIG. 5
FIG. 3
FIG. 4

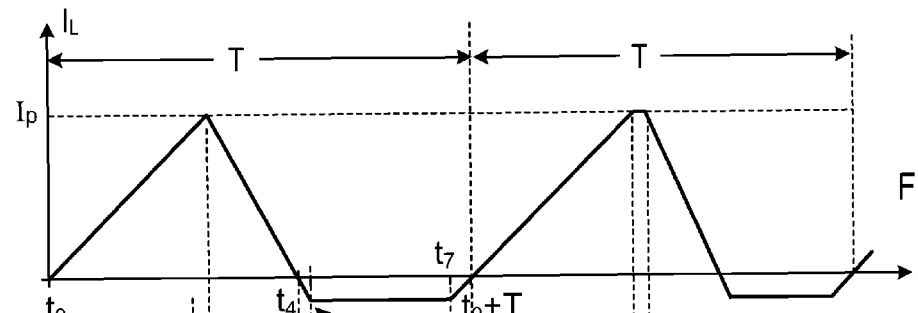
FIG. 6A
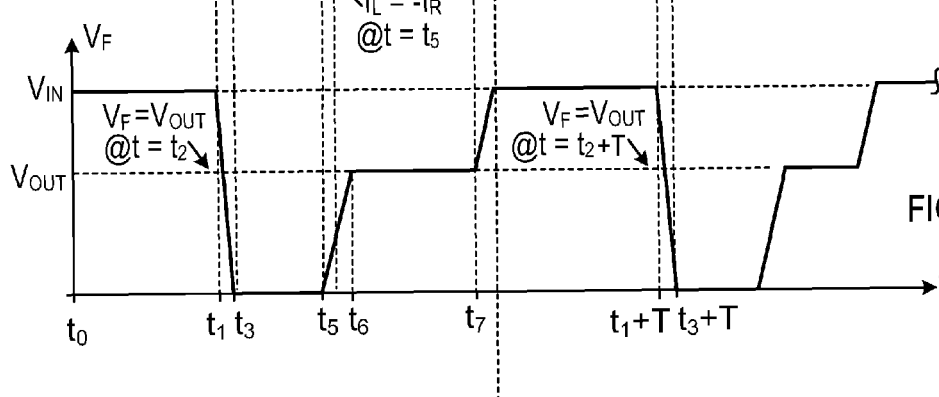
FIG. 6B
FIG. 6C
FIG. 6D
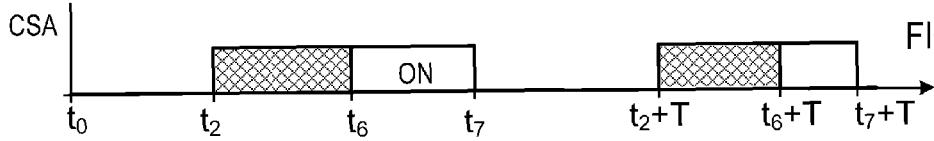
FIG. 6E
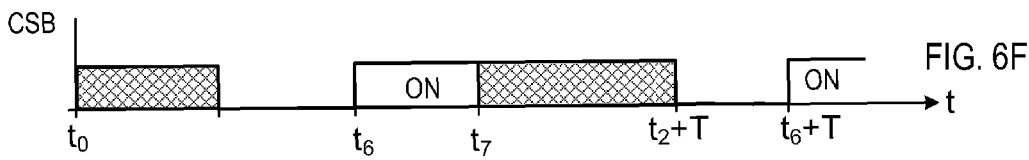
FIG. 6F

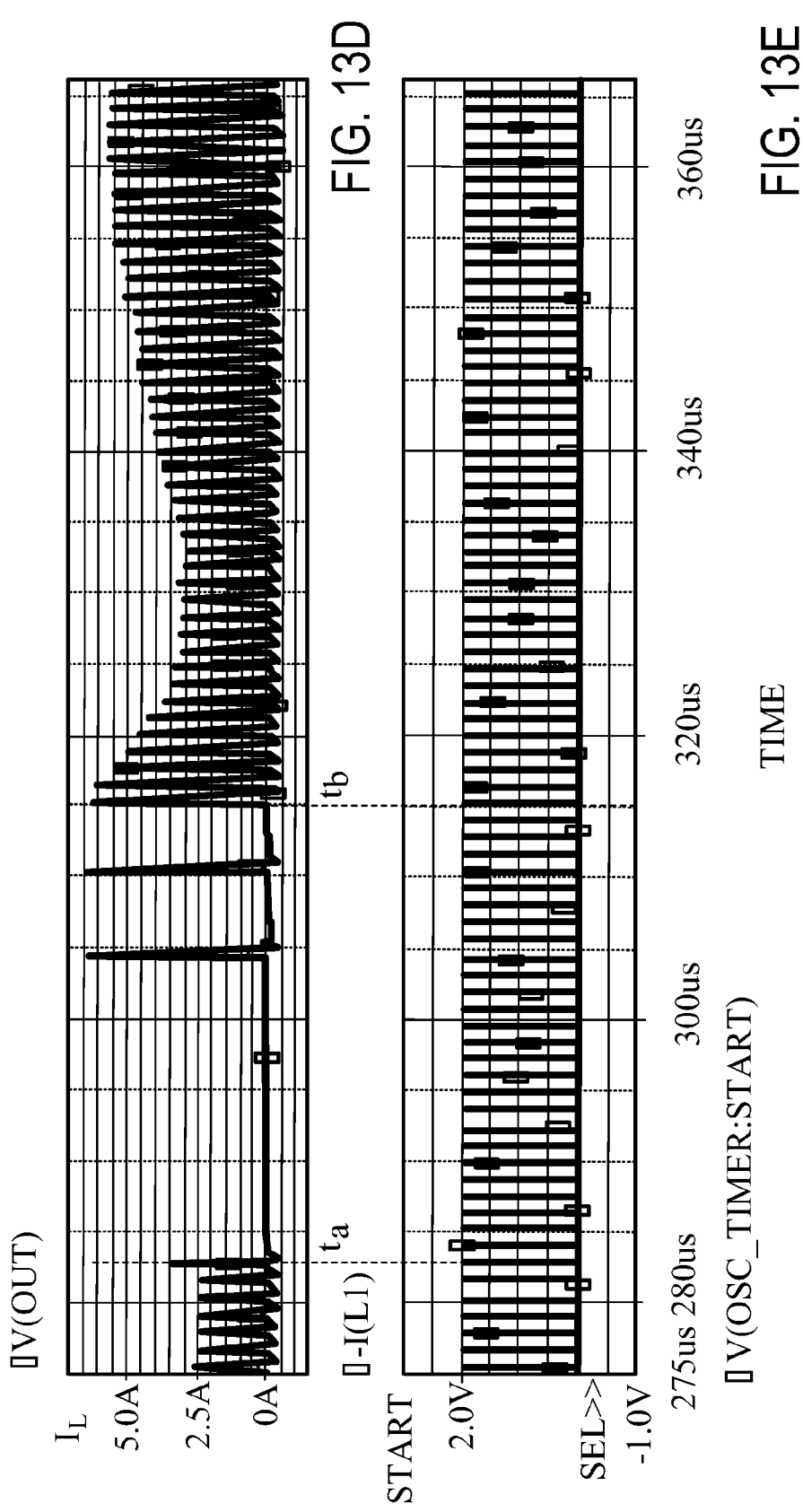

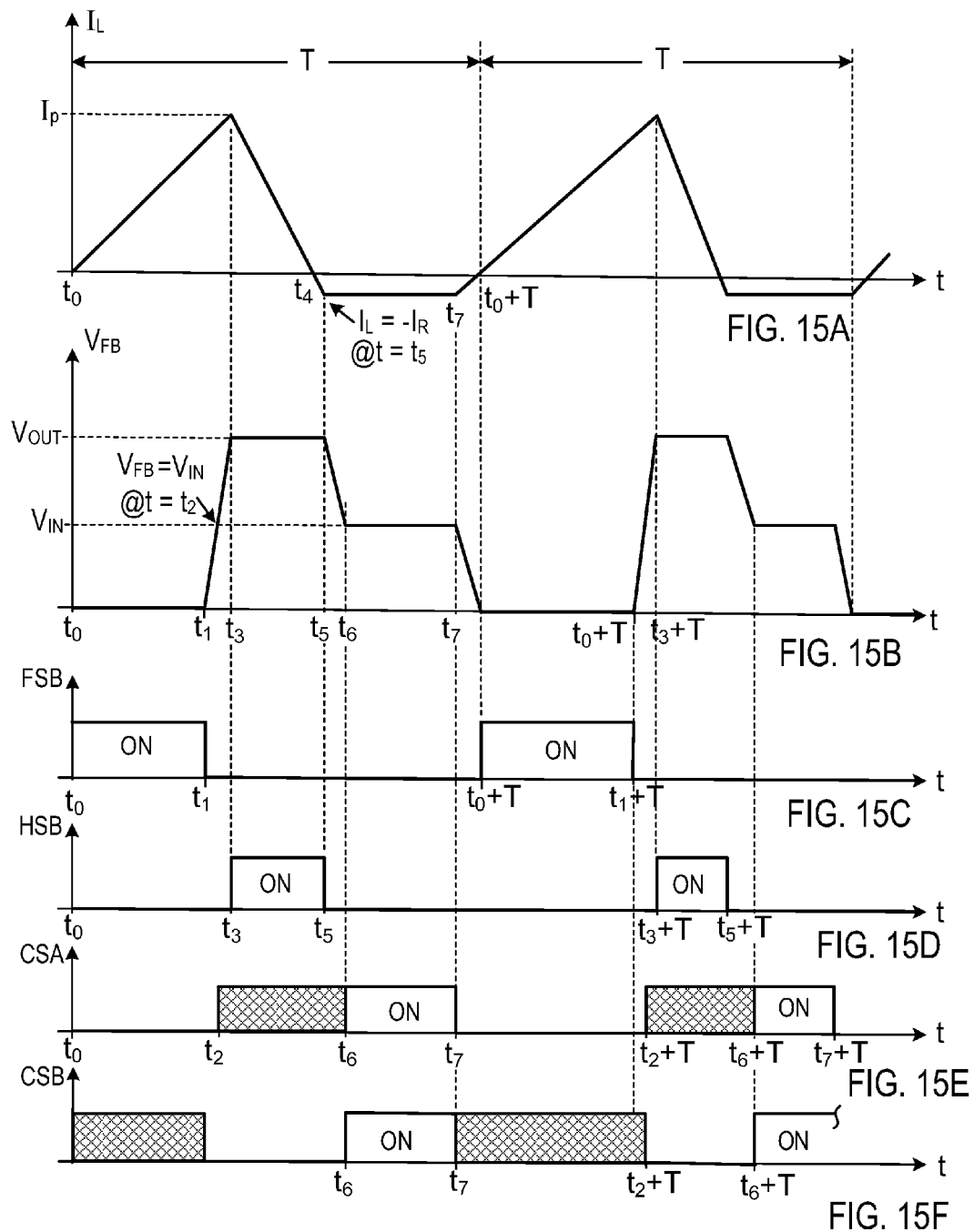

US 9,787,179 B1

APPARATUS AND METHODS FOR CONTROL OF DISCONTINUOUS-MODE POWER CONVERTERS

TECHNICAL FIELD

This invention relates to apparatus and methods for controlling discontinuous-mode power converters.

BACKGROUND

FIG. 1 shows a schematic of a synchronous buck converter 10. The converter receives power from a DC input source 15 at a voltage $V_{in}$ and provides power to a load 25 at a voltage $V_{out} < V_{in}$. The output voltage, $V_{out}$, is presumed to be substantially constant, e.g. as a result of filter capacitance included in load 25. The converter is a switching power converter, i.e. a converter in which energy flow between the input source and the load is controlled by controlling the times at which one or more switches are turned ON and OFF during each of a series of converter operating cycles. The converter of FIG. 1 may be operated in a continuous-mode, in which a unidirectional current flows continuously in the inductor throughout each converter operating cycle, or it may be operated in a discontinuous-mode, in which the current in the inductor returns to or crosses zero at or prior to the end of each converter operating cycle.

Waveforms for the converter 10 operating in a discontinuous mode are shown in FIGS. 2A and 2B. As shown at time t1, MOSFET switch S1 is turned OFF and the current, Io, in inductor L 40 commutates into diode 31 (which may be the body diode of MOSFET synchronous switch 30). Low resistance synchronous switch MOSFET S2 30 may be turned ON at any time between t1 and t2 as a means of bypassing diode 31 and reducing energy loss. Between times t1 and t2 the voltage across switch S2 30, $V_{ss}$ (FIG. 2A), is substantially zero and the current in the inductor 40 is declining. At time t2 the current $I_O$ declines to zero and switch S2 30 is turned OFF. Following the turning OFF of switch S2 a resonant ringing will occur in the resonant circuit formed by inductor 40 and parasitic circuit capacitances (e.g. parasitic capacitances, not shown, associated with switches S1 and S2 and with inductor L), as illustrated in FIGS. 2A and 2B. Contributing to the ringing are the output voltage, $V_{out}$, and energy that may be stored in inductor 40 owing to switch 30 being turned OFF slightly before or after the time at which the current $I_O$ equals zero. At time t3 switch S1 is turned ON and the voltage $V_{ss}$ rises to a value substantially equal to $V_{in}$.

Parasitic voltage and current oscillations of the kind shown in FIGS. 2A and 2B may create losses that can account for several percent of the total energy processed during a converter operating cycle. EMI filtering may also be needed to reduce the effects of the oscillatory "noise" on the input source 15 and the load 25. Filter elements create more circuit complexity, reduce converter power density and may contribute additional losses.

One way to reduce losses and oscillatory "noise" in a discontinuous-mode power converter is described in Prager et al, *Loss and Noise Reduction in Power Converters*, U.S. Pat. No. RE40,072 (the '072 patent), incorporated herein in its entirety by reference. As described in the '072 patent, and shown in FIG. 3, a unidirectional switch 50, comprising a switch 51 in series with a diode 52, may be placed across the inductor 40 in buck converter 70. After switch 74 turns OFF, the voltage across freewheeling diode 75 declines as the forward current $I_L$ in inductor 40 discharges circuit parasitic capacitances. Thereafter, switch 51 may be turned ON after the voltage $V_1$ declines below a value $V_{out}$ (because diode 52 will be reverse biased and prevent conduction in the unidirectional switch 50). With switch 74 OFF, the inductor current $I_L$ declines towards zero. Owing to reverse recovery effects (bipolar diode) and/or diode capacitance (Schottky diode), diode conduction does not cease until shortly after the inductor current passes through zero, resulting in a reverse flow of current in the inductor 40, $I_L$. With switch 51 ON, the reverse inductor current flows in the loop formed by switch 50 and inductor 40; the inductor energy is effectively "trapped" in the inductor; and parasitic oscillations are prevented. Prior to the turning ON of switch 74 at the beginning of the next operating cycle, switch 51 is turned OFF, enabling the reverse flow of current $I_L$ to charge circuit parasitic capacitances (e.g., parasitic capacitances of switch 74, diode 75 and inductor 40, not shown) such that the voltage $V_1$ increases, thereby reducing or eliminating switching loss associated with the subsequent turning ON of switch 74.

SUMMARY

In general, one aspect features an apparatus that includes a switching power converter. The switching power converter includes an input for receiving energy from a source; an output; an inductor and one or more switches connected to deliver energy from the input to the output during a succession of converter operating cycles; clamp circuitry connected to trap energy in the inductor; and a controller adapted to control the conductivity of the switches and the clamp circuitry. The clamp circuitry includes a first clamp switch and a second clamp switch connected in series, an end of the first clamp switch connected to an end of the inductor, an end of the second clamp switch connected to the other end of the inductor, and the clamp circuitry is configured to conduct a current that flows in the inductor when the clamp circuitry is controlled to be conductive, and block a voltage of either polarity when the clamp circuitry is controlled to be non-conductive.

In general, one aspect features an apparatus that includes a switching power converter. The switching power converter includes an input for receiving energy from a source; an output; an inductor having an inductor input and an inductor output; one or more switches connected to transfer energy forward from the input to the output via the inductor; clamp circuitry having a first clamp terminal connected to the inductor input, a second clamp terminal connected to the inductor output, a first clamp switch and a second clamp switch connected in series between the first and second clamp terminals, the first and second clamp switches each having a control input. The clamp circuitry is configured and arranged to: (a) conduct current uni-directionally from the first clamp terminal to the second clamp terminal with the first clamp switch ON; (b) conduct current uni-directionally from the second clamp terminal to the first clamp terminal with the second clamp switch ON; (c) conduct current bi-directionally between the first and second clamp terminals with both of the first and second clamp switches ON; and (d) block current in both directions between the first and second clamp terminals with both of the first and second clamp switches OFF. The switching power converter includes a controller adapted to operate the switching power converter in a series of converter operating cycles including: an energy transfer phase during which the one or more switches are operated to transfer energy from the input to the inductor and from the inductor to the output, the energy transfer phase being characterized by a positive current flowing in the inductor and a reversal in polarity of a voltage across the inductor; and a clamp phase during which the first and second clamp switches are operated to conduct a negative flow of inductor current, including: (i) turning one of the first or second clamp switches ON after the voltage across the inductor reverses polarity during the energy transfer phase and before the beginning of the clamp phase, and (ii) turning the other of the first or second clamp switches OFF after the end of the clamp phase and before the voltage across the inductor reverses polarity again.

Implementations of the apparatuses can include one or more of the following features. In some examples, one of the clamp switches can be a MOSFET. In some examples, both clamp switches can be MOSFETs. One of the clamp switches can include a controllable switch connected across a diode. The controllable switch can be a bipolar transistor. The power converter can be a buck converter. The energy transfer from the inductor to the output can overlap in time with the energy transfer from the input to the inductor and the power converter functions as a buck converter. The power converter can be a boost converter. The energy transfer from the inductor to the output does not overlap in time with the energy transfer from the input to the inductor and the power converter can function as a boost converter. The controller can be configured to: control the one or more switches to transfer energy from the input to the output in a series of converter operating cycles, the transfer of energy associated with a positive flow of inductor current; and control the clamp circuitry to conduct a negative inductor current during a clamp phase of the operating cycle. The controller can be further adapted to selectively operate the one or more switches to establish a, or increase the magnitude of the, negative flow of current in the inductor after the clamp circuitry is turned OFF. The negative flow of current can provide a reduction in a voltage across a non-conductive switch after the clamp circuitry is turned OFF.

In general, one aspect features a method that includes providing switching power conversion circuitry that includes an inductor and one or more switches connected to selectively deliver energy from an input source to an output at an output voltage during a converter operating cycle; providing control circuitry for turning the one or more switches ON and OFF during the converter operating cycle; and configuring the control circuitry to: receive a first threshold; receive a pulse-count threshold; deliver an error voltage having a magnitude that increases as the power delivered to the output increases; compare the error voltage to the first threshold; operate the converter in a first discontinuous mode, in which energy is transferred to the output during every converter operating cycle, when the error voltage is above the first threshold; operate the converter in a second discontinuous operating mode, in which a set of one or more consecutive operating cycles during which energy is transferred is separated, by a series of one or more consecutive operating cycles during which energy is not transferred, from another set of one or more consecutive operating cycles during which energy is transferred, after the error voltage drops below the first threshold; and exit the second discontinuous operating mode when the number of consecutive operating cycles during which no energy is transferred becomes less than the pulse-count threshold.

Implementations of the method can include one or more of the following features. The method can include providing clamp circuitry for conducting inductor current during a clamp phase of an operating cycle. The method can include configuring the control circuitry to: receive a second threshold; compare a converter output voltage to the second threshold; and exit the second discontinuous operating mode when the output voltage drops below the second threshold.

In general, one aspect features a method that includes providing switching power conversion circuitry including an inductor and one or more switches connected to deliver energy from an input source to an output during a converter operating cycle; providing clamp circuitry for conducting a current flowing in the inductor during a portion of the converter operating cycle; providing control circuitry for turning the one or more switches and the clamp circuitry ON and OFF; and controlling, during the operating cycle: the ON and OFF times of the switches to provide a reverse flow of current in the inductor; the ON times of the clamp circuitry to conduct the reverse flow of current; and the ON time of one or more of the switches to establish a, or increase the magnitude of the, negative flow of current in the inductor after the clamp circuitry is turned OFF.

In general, one aspect features a method that includes providing switching power conversion circuitry including: an input for receiving energy from an input source; an output; an inductor having an inductor input and an inductor output; one or more switches connected to transfer energy from the input to the output via the inductor; providing clamp circuitry having a first clamp terminal connected to the inductor input, a second clamp terminal connected to the inductor output, a first clamp switch and a second clamp switch connected in series between the first and second clamp terminals, the first and second clamp switches each having a control input, the clamp circuitry being configured and arranged to: (a) conduct current uni-directionally from the first clamp terminal to the second clamp terminal with the first clamp switch ON; (b) conduct current uni-directionally from the second clamp terminal to the first clamp terminal with the second clamp switch ON; (c) conduct current bi-directionally between the first and second clamp terminals with both of the first and second clamp switches ON; (d) block current in both directions between the first and second clamp terminals with both of the first and second clamp switches OFF. The method includes providing a controller for controlling the conductivity of the one or more switches and the clamp switches in a series of converter operating cycles; and configuring the controller to: control the conductivity of the one or more switches to transfer energy from the input to the inductor and from the inductor to the output during an energy transfer phase, the energy transfer phase being characterized by a positive flow of current in the inductor and a reversal in polarity of a voltage across the inductor; control the conductivity of the first and second clamp switches to conduct a negative flow of inductor current during a clamp phase of the operating cycle; turn one or the other of the first and second clamp switches ON after the voltage across the inductor reverses polarity during the energy transfer phase and before the beginning of the clamp phase; and turn the other of the first and second clamp switches OFF after the end of the clamp phase and before the voltage across the inductor reverses polarity again.

Implementations of the method can include one or more of the following features. In some examples, providing switching power conversion circuitry can include providing buck converter circuitry. The energy transfer from the inductor to the output can overlap in time with the energy transfer from the input to the inductor and providing switching power conversion circuitry comprises providing a buck converter. In some examples, providing switching power conversion circuitry can include providing boost converter circuitry. The energy transfer from the inductor to the output does not overlap in time with the energy transfer from the input to the inductor and providing switching power conversion circuitry can include providing a boost converter. Providing clamp circuitry can include providing clamp circuitry having a first clamp terminal connected to an input end of the inductor, a second clamp terminal connected to an output end of the inductor, a first clamp switch and a second clamp switch connected in series between the first and second clamp terminals, the first and second clamp switches each having a control input. The clamp circuitry can be configured and arranged to: (a) conduct current uni-directionally from the first clamp terminal to the second clamp terminal with the first clamp switch ON; (b) conduct current uni-directionally from the second clamp terminal to the first clamp terminal with the second clamp switch ON; (c) conduct current bi-directionally between the first and second clamp terminals with both of the first and second clamp switches ON; and (d) block current in both directions between the first and second clamp terminals with both of the first and second clamp switches OFF. The method can include configuring the control circuitry to: control the ON and OFF times of the one or more switches to transfer energy from the input to the inductor and from the inductor to the output during an energy transfer phase, the energy transfer phase being characterized by a positive flow of current in the inductor and a reversal in polarity of a voltage across the inductor; control the ON and OFF times of the first and second clamp switches to conduct a negative flow of inductor current during a clamp phase of the operating cycle; turn one or the other of the first and second clamp switches ON after the voltage across the inductor reverses polarity during the energy transfer phase and before the beginning of the clamp phase; and turn the other of the first and second clamp switches OFF after the end of the clamp phase and before the voltage across the inductor reverses polarity again. The method can include configuring the control circuitry to selectively operate the one or more switches to establish, or increase the magnitude of the, negative flow of current in the inductor after the clamp circuitry is turned OFF. The method can include configuring the control circuitry to: receive a first threshold; receive a pulse-count threshold; deliver an error voltage having a magnitude that increases as the power delivered to the output increases; compare the error voltage to the first threshold; operate the converter in a first discontinuous mode, in which energy is transferred to the output during every converter operating cycle, when the error voltage is above the first threshold; operate the converter in a second discontinuous operating mode, in which a set of one or more consecutive operating cycles during which energy is transferred are separated from another set of one or more consecutive operating cycles during which energy is transferred by a series of one or more consecutive operating cycles during which energy is not transferred, after the error voltage drops below the first threshold; and exit the second discontinuous operating mode when the number of consecutive operating cycles during which no energy is transferred becomes less than the pulse-count threshold. The method can include configuring the control circuitry to: receive a second threshold; compare a converter output voltage to the second threshold; and exit the second discontinuous operating mode when the output voltage drops below the second threshold.

DESCRIPTION OF THE DRAWINGS

FIG. 3 shows a schematic diagram of a buck converter with a prior art clamp circuit.

FIG. 4 shows a schematic diagram of a buck converter comprising an improved clamp circuit.

FIG. 5 shows a schematic diagram of a MOSFET.

FIGS. 6A through 6F show waveforms for the converter of FIG. 4.

FIGS. 13A through 13E show waveforms for the converter of FIG. 4.

FIGS. 15A through 15F show waveforms for the converter of FIG. 14.

Like reference numbers in the various drawings indicate like elements.

DETAILED DESCRIPTION

I. Back-to-Back Clamp

Figure 7:
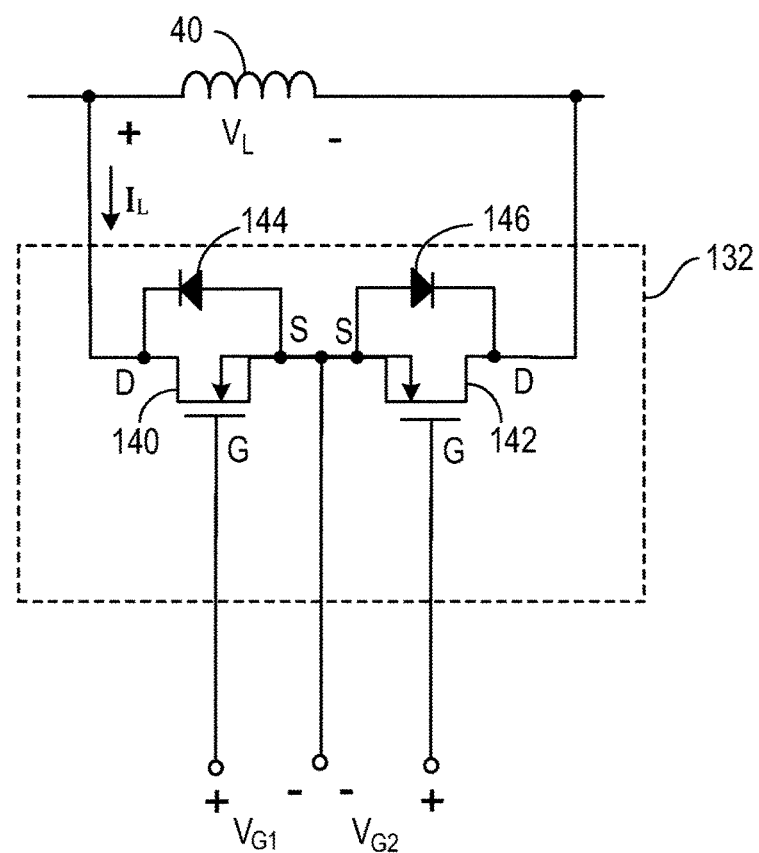
FIG. 7 shows a back-to-back clamp circuit.

Referring to FIG. 7, an embodiment of an improved clamp circuit 132 is shown having a pair of N-channel MOSFETS 140, 142 configured in a "back-to-back" arrangement with their respective source terminals, S, connected together and their respective drain terminals, D, connected to opposite ends of the inductor 40. The back-to-back configuration is able to block a voltage, $V_{out}$, of either polarity when both switches are OFF and is able to conduct a clamp current, $I_C$, of either polarity when both switches are ON. Unidirectional current conduction is enabled by turning one or the other of the switches ON. By proper selection of MOSFET transistors, conduction losses in the clamp circuit 132 of FIG. 7 may be made smaller than comparable losses in the prior art clamp circuit 50 shown in FIG. 3. Operation and benefits of the back-to-back clamp circuit will be illustrated first in a buck converter and then in a boost converter.

A. Buck Converter

FIG. 4 shows a schematic of an embodiment of a synchronous buck converter 100 with an improved clamp circuit 132. The synchronous buck converter 100, which receives energy from an input source 115 at an input voltage $V_{in}$ and delivers energy to a load 125 at a load voltage $V_{out}$, includes a high-side switch HS 110 in parallel with a diode 112, a synchronous switch FS 114 in parallel with a diode 116, and an inductor 40. The clamp circuit 132 includes a first clamp switch CSA 120 in parallel with a diode 122 and a second clamp switch CSB 124 in parallel with a diode 126. Each switch 110, 114, 120, 124 and its respective diode 112, 116, 122, 126 may for example be implemented as a MOSFET transistor with an intrinsic diode such as is shown schematically in FIG. 5 (MOSFET 134 including an intrinsic diode 136) or as a switching device such as a MOSFET or bipolar transistor in parallel with a separate diode. A controller 130 (FIG. 4) may control the timing of the opening and the closing of the switches 110, 114, 120, 124 to operate the converter 100 in a discontinuous conduction mode ("DCM" or "discontinuous mode") of operation.

Waveforms for the converter of FIG. 4, operating in a discontinuous mode are shown in FIGS. 6A-6F having an operating period T. FIG. 6A shows the inductor current $I_L$. FIG. 6B shows the voltage $V_F$ across switch FS 114. FIGS. 6C through 6F show, respectively, the ON and OFF states of switches HS 110, FS 114, CSA 120 and CSB 124 (cross-hatched regions in FIGS. 6E and 6F indicate periods during which a switch may be either ON or OFF).

Referring to FIGS. 6A through 6F, an operating cycle may be initiated at time t0 by turning the high side switch 110 ON. Between times t0 and t1, a positive voltage $V_L = V_{in} - V_{out}$ is impressed across the inductor 40, causing the inductor current $I_L$ to increase thereby transferring energy from the input to the inductor. At time t1, switch HS may be turned OFF ending the transfer of energy from the input to the inductor and allowing the inductor current (positive) to charge and discharge the parasitic capacitances associated with node N (FIG. 4), e.g. the parasitic capacitance modeled by lump capacitor Cp 117 (FIG. 4) causing the voltage $V_F$ to decline towards zero during a first zero-voltage switching ("ZVS") interval. As the voltage $V_F$ at node N drops, the voltage, $V_L$, across inductor 40 also drops and as $V_F$ drops below the output voltage $V_{out}$, at time t2 the polarity of $V_L$ reverses ($V_L = V_F - V_{out}$).

At time t3, switch FS 114 may be turned ON when the voltage $V_F$ has reached a minimum, preferably zero volts, terminating the first ZVS interval and minimizing switching losses in switches HS and FS, and reducing the losses attributable to the diode 116. With switch FS ON, a negative voltage $V_L = -V_{out}$ will be impressed across inductor 40, causing the inductor current $I_L$ to decline. At time t4, the inductor current $I_L$ may pass through zero, reverse polarity, and begin to build negatively.

At time t5, switch FS may be turned OFF when the inductor current reaches a negative level, $I_L = -I_R$, (the magnitude of which may be predetermined) terminating energy transfer between the inductor and the output and allowing the inductor current (negative) to charge and discharges the parasitic capacitances associated with node N (FIG. 4) causing the voltage $V_F$ to increase during a second ZVS interval.

Figure 1:
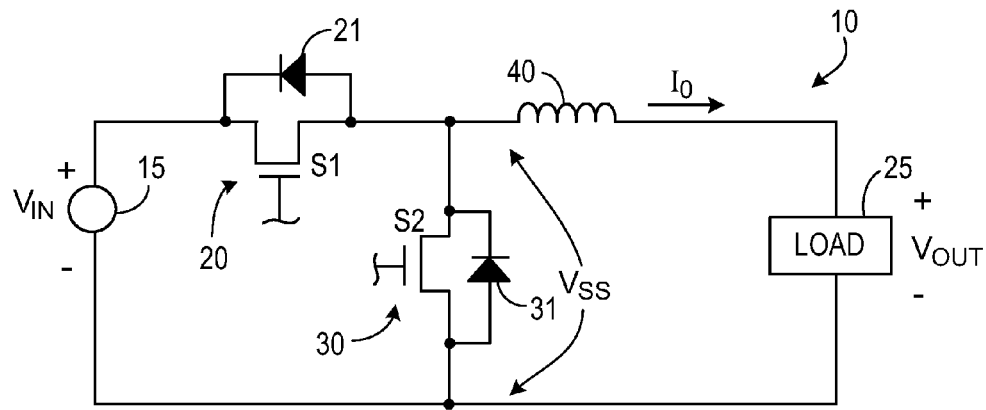
FIG. 1 shows a schematic diagram of a synchronous buck converter.
Figure 2A:
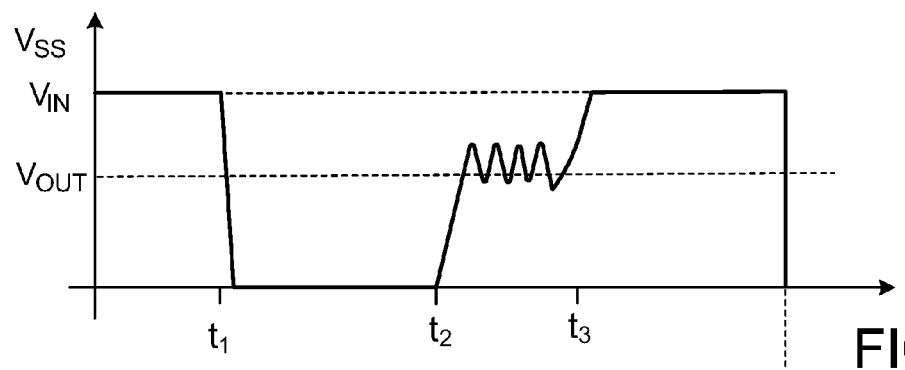
FIGS. 2A and 2B show waveforms for the converter of FIG. 1.
Figure 2B:
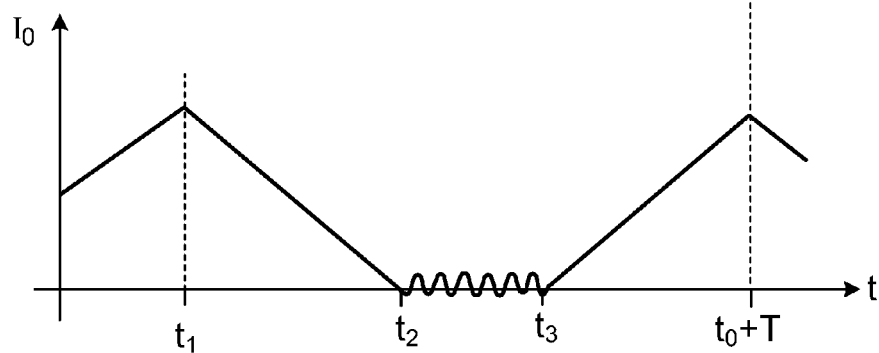

The clamp circuit 132 may be engaged to initiate a clamp phase during which energy is trapped in the inductor, essentially losslessly. A clamp phase may be used for example to elongate the operating cycle reducing the operating frequency of the converter while still preserving ZVS transitions of the switches such as during light load conditions or to prevent undesirable oscillations (FIG. 2) between the inductor and circuit parasitic capacitances 117. Preferably, the clamp circuit 132 may be engaged at times when a relatively low current is flowing in the inductor, for example when the small negative current $I_R$ is flowing in the inductor and also when the voltage across the inductor is at a minimum, e.g. zero. It may therefore be desirable to engage the clamp circuit when $V_L$ essentially reaches zero volts at time t6.

To prepare the clamp circuit 132, the first clamp switch CSA may be turned ON leisurely any time after time t2 and before time t6 (cross-hatched region, FIG. 6E) because the voltage $V_L$ will be negative throughout that time period causing diode 126 to be reverse biased, thereby preventing conduction through switch CSA. At time t6, when the voltage $V_F$ has increased to within a forward diode drop of $V_{out}$, the (negative) inductor current will commutate into the path formed by the first clamp switch CSA and series diode 126 which will then be forward biased, thereby trapping energy within the inductor 40 ("clamp engaged"). In the circuit of FIG. 4, the second clamp switch CSB may preferably be turned ON at a time substantially equal to t6, thereby bypassing diode 126 and reducing losses that would otherwise be associated with the flow of current in diode 126. To account for circuit propagation delays, it may be desirable to turn switch CSB ON at a pre-determined time prior to time t6. However, because diode 126 will provide the requisite conduction path for the clamp circuit 132, CSB may be turned ON after time t6.

The clamp phase may be ended by turning the first clamp switch CSA OFF at time t7, causing the (negative) inductor current to flow towards node N, charging and discharging the parasitic capacitances associated with node N causing $V_F$ to increase towards $V_{out}$ during a third zero-voltage switching interval. With $V_F$ greater than $V_{out}$, after time t7, $V_L$ will be positive reverse biasing diode 122 preventing conduction through the second clamp switch CSB and thus the clamp circuit 132 appears once again as an open circuit. Therefore, the second clamp switch CSB may be turned OFF leisurely any time after time t7 and before time t2+T (when the inductor voltage $V_L$ once again turns negative).

High side switch HS, may be turned ON, preferably when $V_F$ equals $V_{IN}$ for ZVS operation to minimize switching losses, at time t0+T, beginning a new converter operating cycle.

B. Boost Converter

Figure 14:
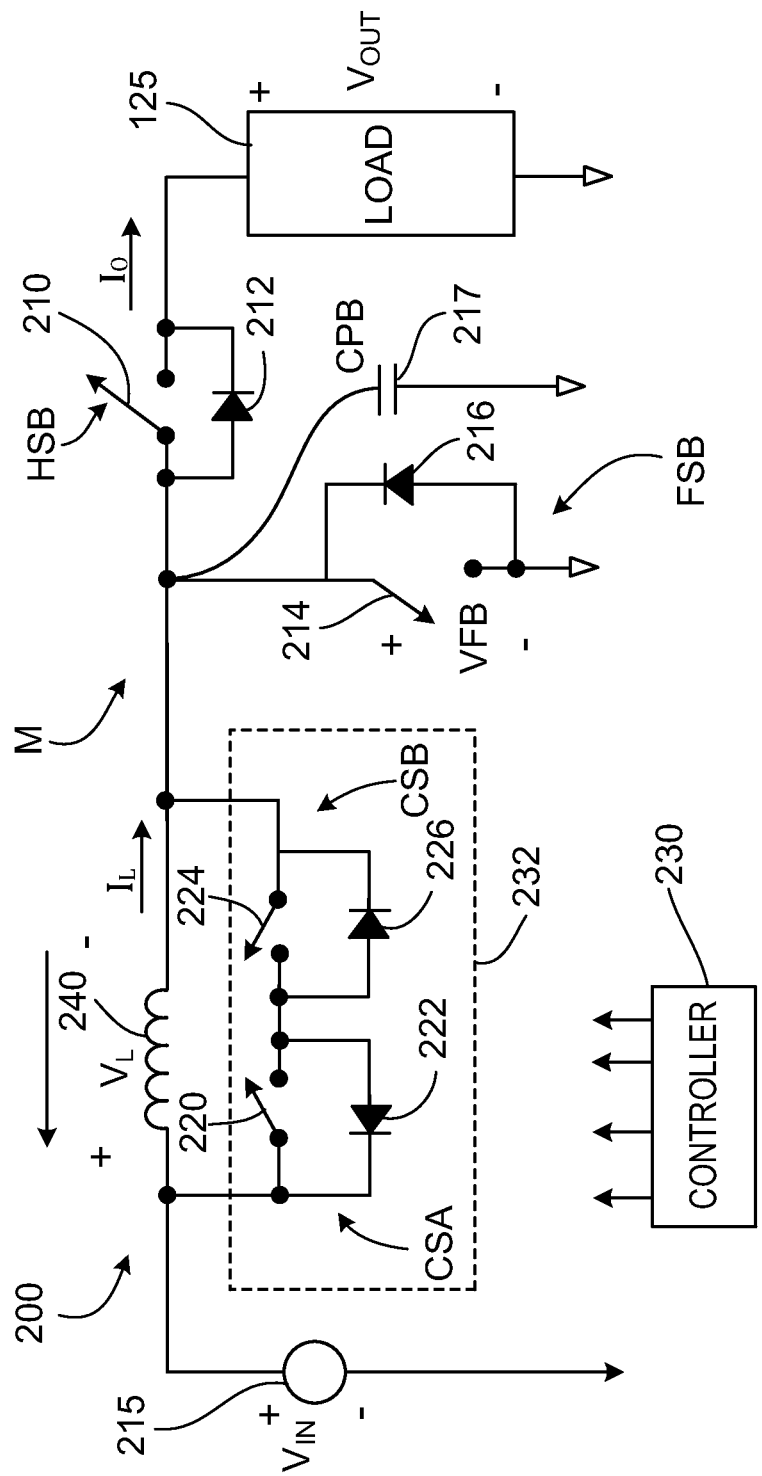
FIG. 14 is a schematic diagram of a boost converter with a clamp circuit.
Figure 16A:
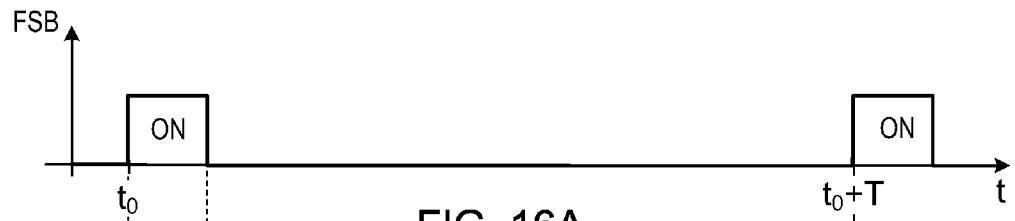
FIGS. 16A through 16E show waveforms for the converter of FIG. 14.
Figure 16B:
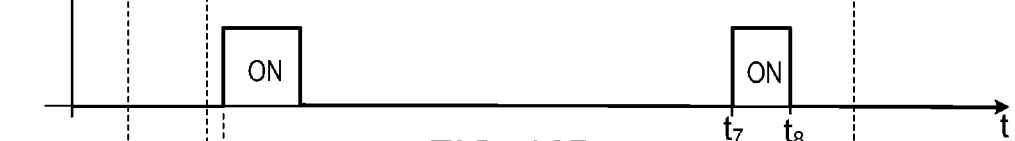
Figure 16C:
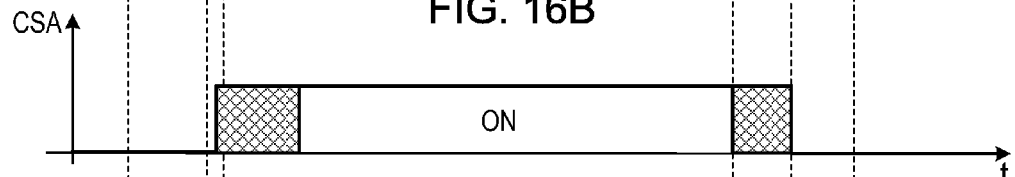
Figure 16D:
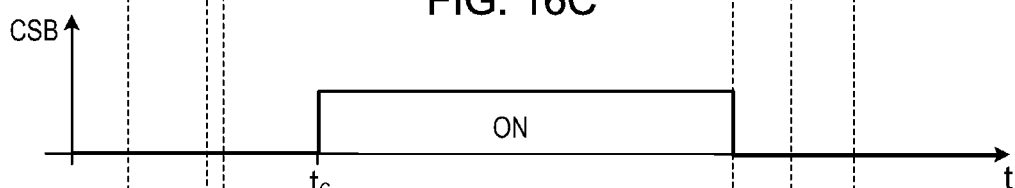
Figure 16E:
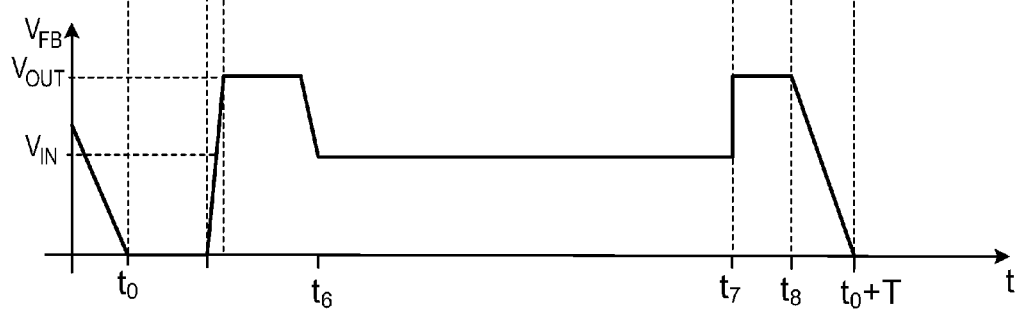

A boost converter 200 having a back-to-back clamp switch 232 is shown in FIG. 14. Waveforms for the boost converter operating in a discontinuous mode are shown in FIG. 15. A comparison of the waveforms in FIG. 15 (for boost converter 200 in FIG. 14) with the waveforms in FIG. 6 (for the buck converter 100 in FIG. 4) within the context of an operating cycle between time t0 and time t0+T reveals that the relative timing of the boost converter shunt switch FSB (FIG. 15C) is analogous to that of the buck converter high side switch HS (FIG. 6C) and the relative timing of the boost converter output switch HSB (FIG. 15D) is analogous to that of buck converter shunt switch FS (FIG. 6D). Similarly, the timing of back-to-back clamp switches CSA 220 (FIG. 15E) and CSB 224 (FIG. 15F) relative to the timing of switch FSB (FIG. 15C) (and HSB (FIG. 15D)) in the boost converter 200 (FIG. 14), is analogous to the timing of back-to-back clamp switches CSA 120 (FIG. 6E) and CSB 124 (FIG. 6F) relative to the timing of switches HS (FIG. 6C) (and FS (FIG. 6D)) in the buck converter 100 (FIG. 4).

Referring to FIGS. 14 and 15, shunt switch FSB may be turned ON at time t0, causing the current $I_L$ in inductor 240 to increase over time initiating transfer of energy from the input to the inductor. At time t1 switch FSB may be turned OFF, ending the energy transfer from the input to the inductor 240, allowing the inductor current (positive) to charge and discharge circuit parasitic capacitances associated with node M, e.g. the parasitic capacitance modeled by lump capacitor CPB 217 (FIG. 14), causing the voltage $V_{FB}$ to rise toward $V_{out}$, initiating a first ZVS interval. As the voltage $V_{FB}$ at node M increases, the voltage, $V_L$, across inductor 240 drops and as $V_F$ increases above the input voltage $V_{in}$, at time t2 the polarity of $V_L$ reverses ($V_L = V_{in} - V_{FB}$). The first clamp switch CSA 220 may be turned ON leisurely any time after time t2 and before time t6 (cross-hatched region, FIG. 15E) to prepare the clamp circuit 232 because the voltage $V_L$ will be negative throughout that time period causing diode 226 to be reverse biased, thereby preventing conduction through switch CSA 220.

At time t3, when the voltage $V_{FB}$ has increased to $V_{out}$, the inductor current will commutate through diode 212 allowing energy to transfer from the inductor to the output and terminating the first ZVS interval. The output switch HSB 210 may be turned ON, preferably at time t3 to reduce the losses attributable to diode 212. With switch HSB ON, a negative voltage $V_L=V_{IN}-V_{out}$ will be impressed across inductor 240, causing the inductor current $I_L$ to decline. At time t4, the inductor current $I_L$ may pass through zero, reverse polarity, and begin to build negatively.

At time t5, the output switch HSB 210 may be turned OFF when the inductor current reaches a negative level, $I_L=-I_R$, (the magnitude of which may be predetermined) terminating energy transfer between the inductor and the output and allowing the inductor current (negative) to charge and discharges the parasitic capacitances associated with node M (FIG. 14) causing the voltage $V_{FB}$ to decrease during a second ZVS interval.

The clamp circuit 232 may be engaged at time t6 to initiate a clamp phase during which energy is trapped essentially losslessly in the inductor when the relatively small negative current, $I_L=-I_R$, is flowing in the inductor and the voltage across the inductor is at a minimum, e.g. zero. As described above in connection with the buck converter, the clamp circuit 232 may be prepared by turning ON the first clamp switch CSA leisurely any time after time t2 and before time t6 (cross-hatched region, FIG. 15E) because the voltage $V_L$ will be negative throughout that time period causing diode 226 to be reverse biased, thereby preventing conduction through switch CSA.

At time t6, when the voltage $V_{FB}$ has decreased to within a forward diode drop of $V_{IN}$, the (negative) inductor current will commutate into the path formed by the first clamp switch CSA and series diode 226 which will then be forward biased, thereby trapping energy within the inductor 240 ("clamp engaged"). The second clamp switch CSB may preferably be turned ON at a time substantially equal to t6, thereby bypassing diode 226 and reducing losses that would otherwise be associated with the flow of current in diode 226. To account for circuit propagation delays, it may be desirable to turn the second clamp switch CSB 224 ON at a pre-determined time prior to time t6. However, because diode 226 will provide the requisite conduction path for the clamp circuit 132, CSB may be turned ON after time t6. The clamp switches CSA and CSB may remain ON for the duration of the clamp phase during which the voltage $V_{FB}$ is substantially equal to $V_{in}$.

The clamp phase may be ended by turning the first clamp switch CSA OFF at time t7, causing the (negative) inductor current to flow towards node M, charging and discharging the parasitic capacitances associated with node M causing $V_{FB}$ to decrease towards zero during a third zero-voltage switching interval. With $V_{FB}$ less than $V_{in}$, after time t7, it will reverse bias diode 222 preventing conduction through the second clamp switch CSB and thus the clamp circuit 232 appears once again as an open circuit. Therefore, the second clamp switch CSB may be turned OFF leisurely any time after time t7 and before time t2+T (when the inductor voltage $V_L$ once again turns negative).

The shunt switch FSB 216 may be turned ON, preferably when $V_{FB}$ equals zero for ZVS operation to minimize switching losses, at time t0+T, beginning a new converter operating cycle.

In both of the buck (FIG. 4) and boost (FIG. 14) converters, energy is transferred from the input source 115, 215 to the inductor 40, 240, and from the inductor to the output, i.e. load 125, during an "energy transfer phase" of the converter operating cycle. The energy transfer phase may be characterized by a positive flow of inductor current $I_L$ (e.g., between times t0 and t4 in FIGS. 6A and 15A) and a reversal in polarity of the inductor voltage $V_L$ during the phase (e.g., at time t2, FIGS. 6 and 15). In the buck converter 100 (FIGS. 4 and 6), energy is transferred from the inductor to the load throughout the entire energy transfer interval, in contrast to the boost converter 200 (FIGS. 4 and 6) where energy transfer from the input to the inductor takes place only during a first portion of the energy transfer interval (e.g., between times t0 and t3, FIG. 6). In the boost converter 200 of FIGS. 14 and 15, the respective portions of the operating cycle during which energy is transferred from the input to the inductor (e.g. between times t0 and t2, FIG. 15) and during which energy is transferred from the input and the inductor to the load (e.g. between times t3 and t4, FIG. 15) do not overlap in time.

Embodiments of the converters of FIGS. 4 and 14 may provide one or more of the following benefits: conduction losses in the clamp circuit 132, 232 may be lower than in prior art clamp circuits, the non-critical timing in the turning ON of clamp switch CLA may allow use of smaller gate charge drivers; the non-critical timing in the turning OFF of clamp switch CLB may allow use of smaller gate discharge drivers; and the relatively relaxed timing of the switches may allow for a less complex controller 130, 230.

II. Light Load

Figure 8:
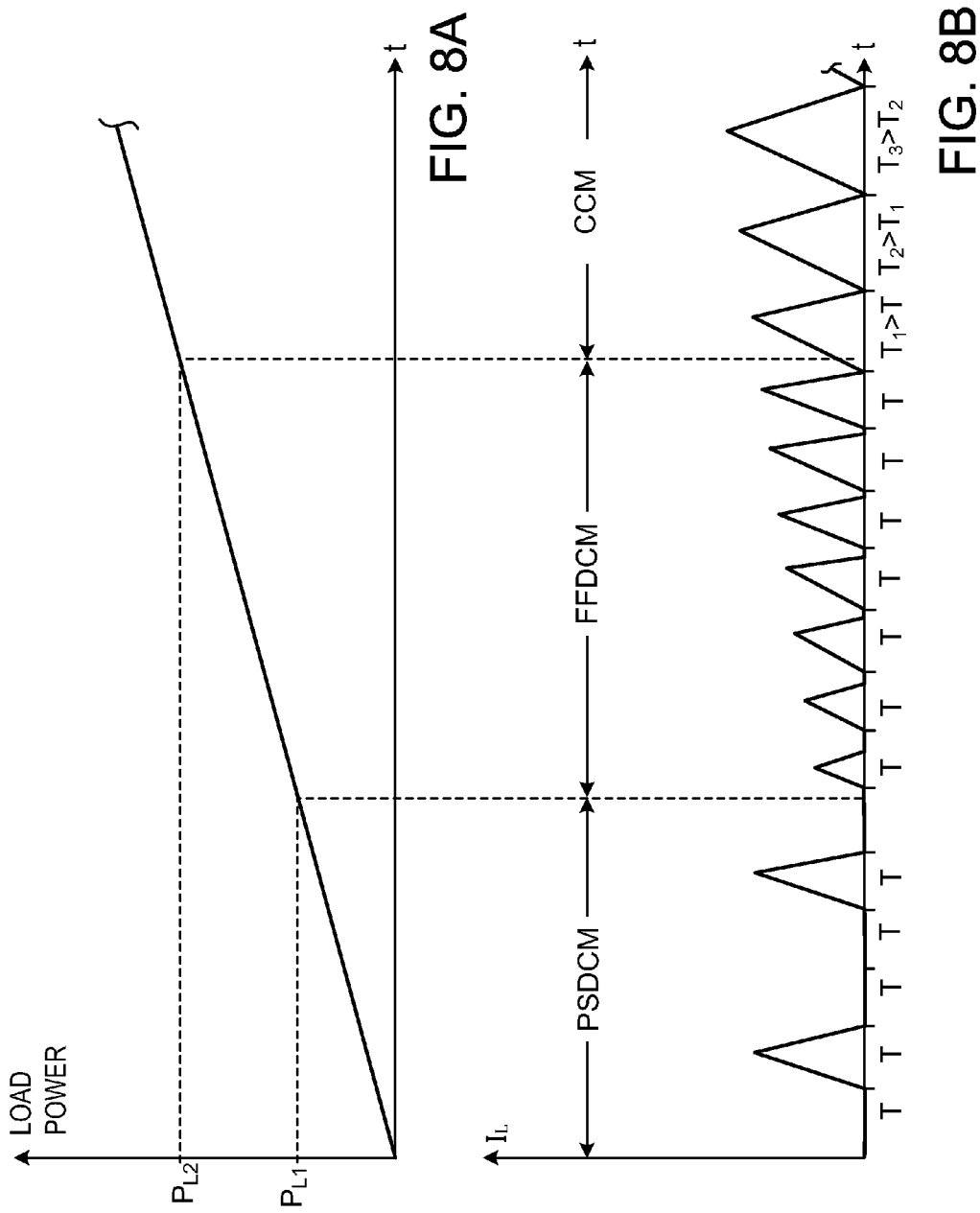
FIGS. 8A and 8B show waveforms for the converter of FIG. 4.

The controller 130, 230 may modify the above-described discontinuous operating mode of the converter 100, 200 as a function of the power required by the load 125. Referring to FIG. 8A which shows load power increasing with time and FIG. 8B which shows the converter operating in the following discontinuous modes as a function of the increasing load power:

(a) Over a range of loads between a first load threshold, PL1, and a second load threshold, PL2, the period, T, of the converter operating cycle is fixed and energy is transferred to the output during every converter operating cycle. In this fixed-frequency discontinuous mode ("FFDCM") the amount of power transferred during each operating period T is a function of the peak current IP (FIG. 6A) and the fraction of the operating period during which energy is transferred to the load. For fixed values of $V_{in}$ and $V_{out}$, the peak current will increase with increasing load, as will the length of the energy transfer interval. When the load reaches the second load threshold PL2 the converter will be on the threshold of a "critical conduction mode" in which the length of the energy transfer interval is substantially equal to the converter operating period, T; the duration of the clamp period approaches zero; and the turning ON of switch HS begins essentially immediately following the turning OFF of switch FS.

(b) For loads above the second load threshold PL2 the converter operates in critical conduction mode ("CCM"). The peak current Ip increases with increasing load, as does the operating period of the converter. Providing a small, minimum, clamp period between operating cycles in this mode (e.g. a 10 nanosecond minimum clamp period in a converter having a 1.2 microsecond operating period) simplifies the design of the controller by enabling the use of a consistent sequence of switch states in all operating modes.

(c) For loads below the first load threshold PL1 the converter may operate in a "pulse-skipping" discontinuous mode ("PSDCM"). In this mode, the period of the converter operating cycle is fixed but energy transfer does not occur during every operating cycle. Rather, sets of one or more consecutive operating cycles during which energy is transferred are separated from each other by a series of one or more consecutive operating cycles during which energy is not transferred. In PSDCM, circuit conditions, such as, e.g. output voltage, are used by the controller 130 to determine whether or not energy is transferred during a particular operating cycle.

As load decreases, the duration of the clamp period increases. In pulse-skipping mode the clamp period may span multiple operating periods. In a non-ideal converter the magnitude of the (negative) inductor current at the end of the clamp period may decrease as the length of the clamp period increases, owing to circuit losses. Eventually, there may be insufficient inductor current at the end of the clamp period to charge and discharge circuit parasitic capacitances for ZVS operation, e.g. preventing switch HS from being turned ON at or near zero-voltage in the buck converter example and causing an increase in losses.

III. Pre-Charge

Figure 9:
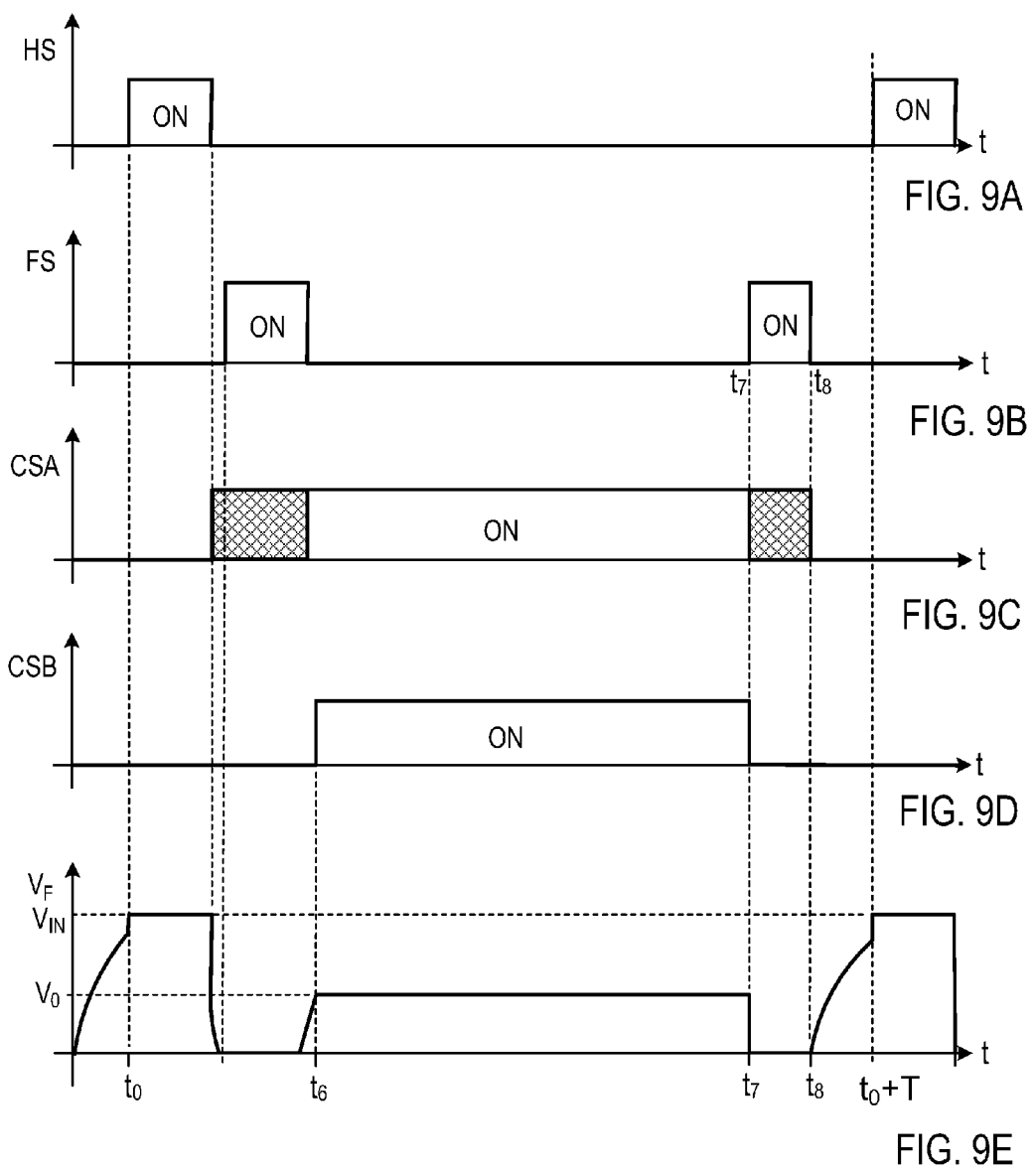
FIGS. 9A through 9E show waveforms for the converter of FIG. 4.

The controller may operate the switches to "pre-charge" the inductor with a negative current to overcome this problem. FIGS. 9A through 9E show waveforms for the converter of FIG. 4 operating at light load with the pre-charge feature enabled. FIGS. 9A through 9D show, respectively, the states of switches HS 110, FS 114, CSA 120 and CSB 124 and the voltage VF. The clamp period (between t6 and t7) in FIG. 9 is sufficiently long so that magnitude of the negative inductor current at the end of the clamp period is substantially lower than the magnitude of the current at the beginning of the period. Converter operation between times t0 and t7 is substantially the same as described earlier with reference to FIGS. 4 and 6. However, at time t7 switch FS may be turned ON, impressing the output voltage across the inductor and causing the voltage VF to drop to zero. Negative inductor current builds up between times t7 and t8: if negative inductor current was flowing at time t7 it will be increased in magnitude between time t7 and time t8; if the inductor current was substantially zero at time t7 a negative flow of current will be re-established between time t7 and time t8. Switch CSB must be turned OFF before FS turns ON to avoid shorting the converter input to the converter output through switches CSB, CSA and FS. At time t8 switch FS is turned OFF. Thereafter, the stored "pre-charge" energy in the inductor will charge parasitic circuit capacitances 117 and ring the voltage VF up towards $V_{in}$. For the buck converter, pre-charge may primarily be of benefit if $V_{out}$ is less than $V_{in}/2$ (assuming that HS and FS have equal switch capacitance); if $V_{out}$ is greater than $V_{in}/2$, the amount of energy lost turning FS ON at time t7 may be greater than the energy that would otherwise be lost in HS without pre-charge.

FIG. 16 show corresponding waveforms for the boost converter of FIG. 14 with the pre-charge feature enabled. Converter operation between times t0 and t7 is substantially the same as described earlier with reference to FIGS. 14 and 15. However, at time t7 switch HSB may be turned ON, causing the voltage $V_{FB}$ to rise to $V_{out}$ and impressing a voltage $V_L=-(V_{out}-V_{in})$ across inductor 240 causing negative inductor current to build up between times t7 and t8. Switch CSB must be turned OFF before HSB turns ON to avoid shorting the converter input to the converter output through switches CSB, CSA and HSB. At time t8, switch HSB may be turned OFF ending the precharge. Thereafter, the stored "pre-charge" energy in the inductor will discharge parasitic circuit capacitances 217 and ring the voltage $V_{FB}$ down towards zero. For the boost converter, pre-charge may primarily be of benefit if $V_{in}$ is greater than $V_{out}/2$ (assuming that HSB and FSB have equal switch capacitance); if $V_{in}$ is less than $V_{out}/2$, the amount of energy lost turning HSB ON at time t7 may be greater than the energy that would otherwise be lost in FSB without pre-charge.

Figure 10:
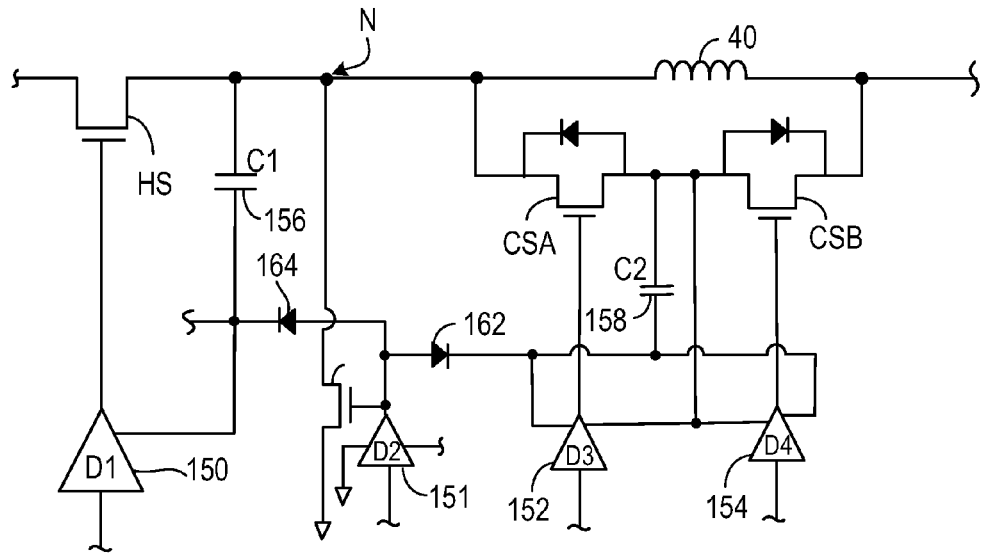
FIG. 10 shows a partial schematic diagram of a power converter.

Bias voltage for driving floating switches HS, CSA and CSB may also decline during a long clamp period. In FIG. 10, for example, floating switch driver D1 150 drives the gate of switch HS, and floating switch drivers D3 152 and D4 154 drive the gates of switches CSA and CSB, respectively. Energy for powering driver D1 is stored in capacitor C1 156; energy for powering drivers D3 and D4 is stored in capacitor C2 158. Driver D2 drives the gate of ground-referenced switch FS. When driver D2 151 outputs a pulse turning switch FS ON, node N drops to ground and capacitors C1 and C2 are charged by the output of D2 via diodes 164 and 162.

The following discussion of operating mode control refers to the buck converter example of FIG. 4, however, the same principles may be applied to the boost converter example of FIG. 14 as well as to any switching power converter topology that operates in a discontinuous mode—i.e., in an operating mode in which inductive energy is stored and released during a converter operating cycle and in which the current in the inductor returns to zero at or prior to the end of each converter operating cycle.

Figure 11:
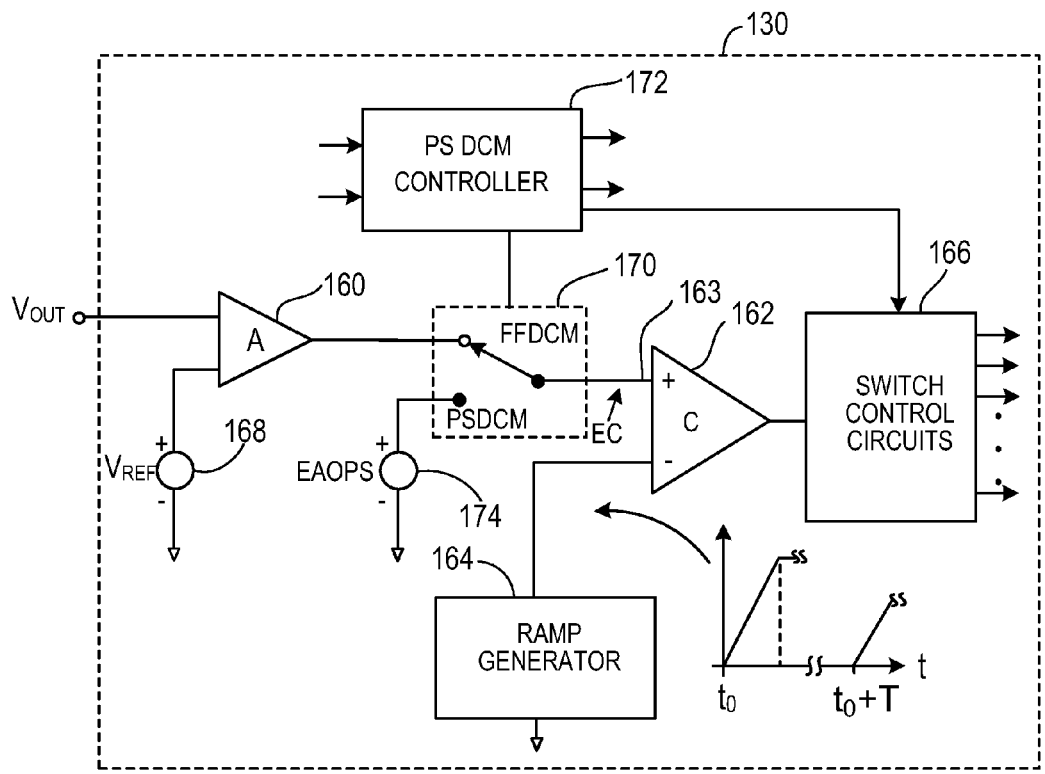
FIG. 11 shows a block diagram of a portion of a controller for a power converter.

In FFDCM the ON time of switch HS may be controlled by controller 130 as a means of regulating the output voltage $V_{out}$ at a pre-determined level, Vref. FIG. 11, for example, shows a block diagram of a controller 130 comprising an error amplifier 160, a voltage reference source 168, a comparator 162, a ramp generator 164, PSDCM controller 172 and switch control circuitry 166. A signal selector 170 connects the output of amplifier 160 to a positive input 163 of comparator 162 when the converter is operating in FFDCM. Switch control circuitry 166 turns switch HS ON when the output of the comparator 162 is high and turns switch HS OFF when the output is low. Amplifier 160 compares the converter output voltage, $V_{out}$, to the voltage reference 168, Vref, and delivers an output, EAO, to an input of comparator 162 via signal selector 170. Comparator 162 compares EAO to the output of a ramp generator 164. The slope of the ramp generated by the ramp generator may be a function of converter operating conditions (e.g., input voltage and/or output voltage). The output of the comparator goes high at the beginning of each operating cycle (e.g., at time t0, FIG. 6); thereafter, when the ramp generator output rises to equal EAO (e.g., at time t1) the comparator output goes low. Thus, the ON time of switch HS is defined by the slope of the ramp generator and the voltage EAO. In the feedback configuration shown in FIG. 11, EAO will increase with increasing load and will seek a level at which the ON time of switch HS maintains $V_{out}$ substantially equal to Vref.

The controller 130 may be configured to enter PSDCM when the average converter load falls below a first load threshold, and exit PSDCM when the load increases above a second load threshold. The first load threshold may be sensed by sensing the output of error amplifier 160, EAO. When the converter is operating in FFDCM and EAO drops below a pre-determined level EAOL (corresponding, e.g., to the first load threshold) for a pre-determined time period (e.g., a pre-determined number of operating cycles; a pre-determined time duration), the controller 130 may change the converter operating mode to PSDCM. The pre-determined values of EAO and the pre-determined time period may be fixed or they may be varied as a function of converter operating conditions (e.g., vary as a function of input voltage and/or output voltage).

When operating in PSDCM, PSDCM control circuitry 172 (FIG. 11) sets signal selector 170 to deliver a pre-determined signal level, EAOPS 174, to the positive input of the comparator 162. The magnitude of EAOPS is made greater than EAOL so that the energy transferred during each ON period in PSDCM is relatively large. When operating in PSDCM, $V_{out}$ is sampled during each operating period, T: if the sampled value of $V_{out}$ is greater than a nominal setpoint value for $V_{out}$ (e.g., Vnom=Vref), HS will be disabled and no energy transfer will take place during the period; if, however, the sampled value of $V_{out}$ is less than the nominal setpoint value, HS will be enabled and energy transfer will take place. Thus, sets of one or more successive operating periods during which energy transfer takes place may be separated from one another by one or more successive pulse-skipping periods during which no energy transfer occurs. By setting EAOPS relatively high (e.g., to a magnitude that would result in maximum energy transfer during an operating period, T), the number of pulse-skipping periods may be made relatively large compared to the number of energy transfer periods. As load power increases, the number of pulse-skipping periods will decrease. When the number of pulse-skipping periods drops below a pre-determined minimum, corresponding, e.g., to the second load threshold, the controller 130 may revert to operation in FFDCM.

In PSDCM, the magnitude of EAOPS and the number of skipped pulses may be used to infer the amount of load. If, for example, EAOPS is set to correspond to a magnitude that, in FFDCM, would correspond to maximum converter power output, then steady-state skipping of one cycle between power pulses in PSDCM would correspond to one-half maximum power output, skipping of two cycles between power pulses would correspond to one-third of maximum output power, and so on. To provide hysteresis in transitioning between modes, the pre-determined minimum number of pulse-skipping periods that is used to determine when to exit PSDCM and resume FFDCM should preferably correspond to an output power level that is higher than the power level that caused initiation of PSDCM.

The controller 130 may also comprise a comparator that continuously compares the output voltage to an undervoltage threshold, Vuvt, that is less than Vnom. Should $V_{out}$ drop below Vuvt, indicating that the load has suddenly increased to a relatively large value, the comparator will signal the controller to immediately exit PSDCM and resume FFDCM.

Using EAO to infer converter load eliminates the need for external load measurement circuitry (e.g., series resistors), thereby reducing circuit losses, complexity and cost. By making pulse energy relatively large in PSDCM, the relative rate at which pulses are generated is reduced, reducing circuit loss at light loads.

Figure 12:
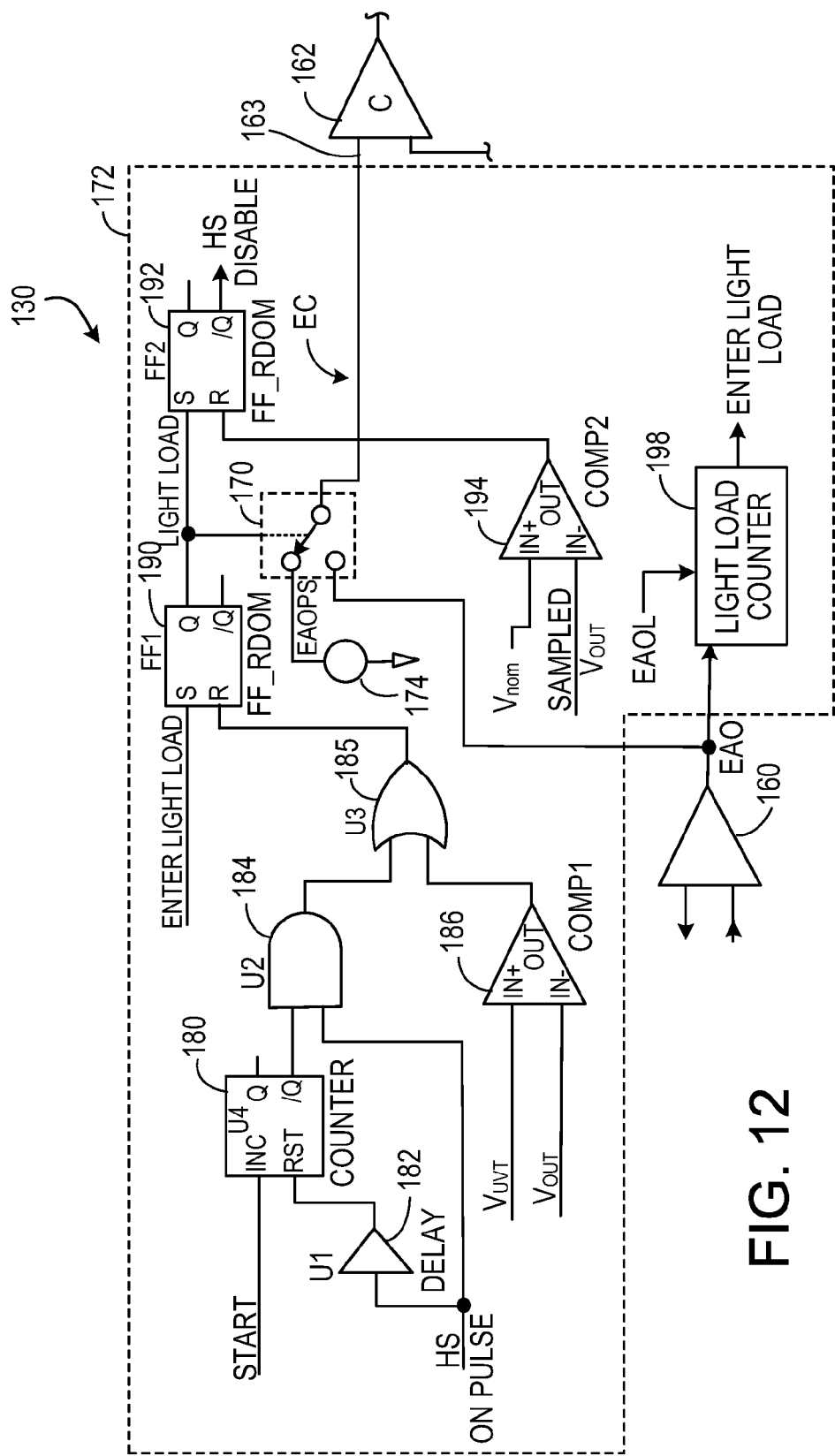
FIG. 12 shows a block diagram of a portion of a controller for a power converter.
Figure 13A:
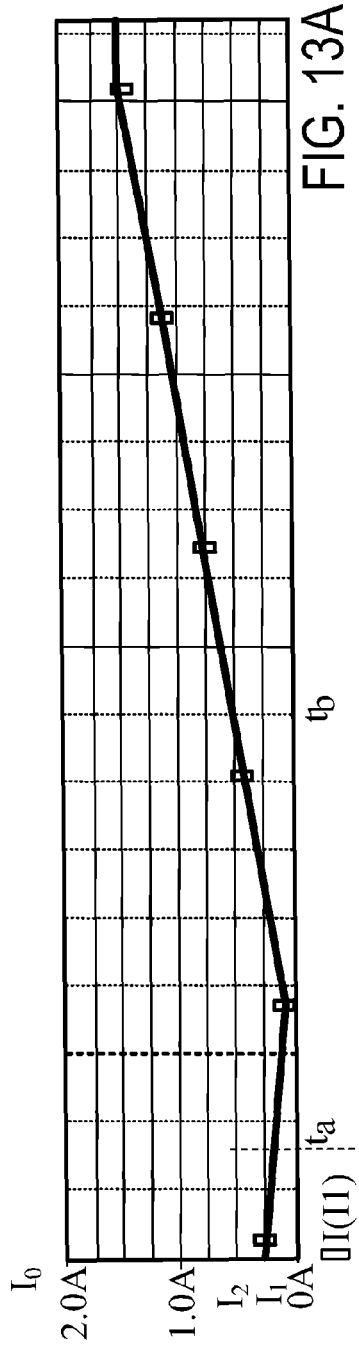
Figure 13B:
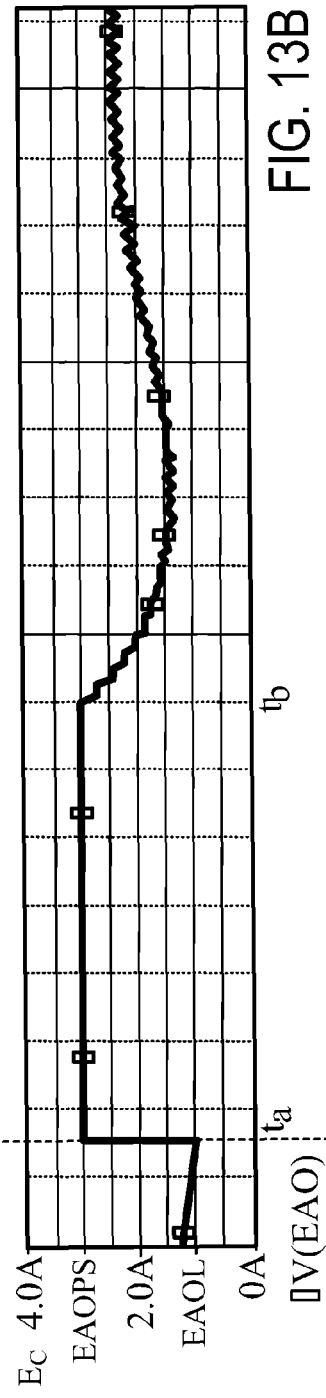
Figure 13C:
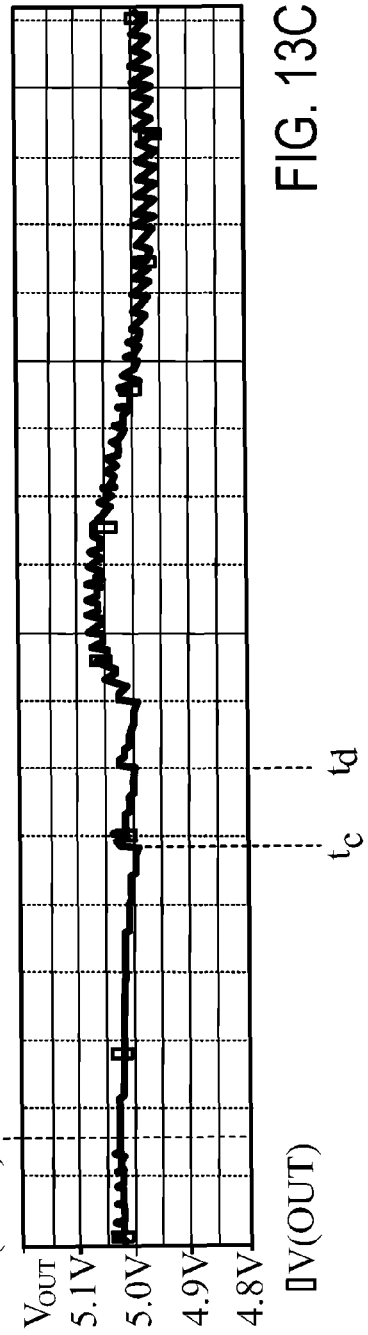

A block diagram of a PSDCM controller 172 (FIG. 11) is shown in FIG. 12. Simulation waveforms for a discontinuous mode buck converter comprising a controller 130 of the kind shown in FIGS. 11 and 12, and operating at a converter operating frequency of 840 KHz, are shown in FIGS. 13A-13E. FIG. 13A shows average output current, Io, delivered to load 125; FIG. 13B shows the signal, Ec, delivered to comparator 162 (FIGS. 11 and 12); FIG. 13C shows the converter output voltage, $V_{out}$; FIG. 13D shows the inductor current, $I_L$; and FIG. 13E shows the system clock oscillator signal, START.

Each leading edge of the START signal in FIG. 13E represents the start of a new controller operating period of duration T. When the EAO output of amplifier 160 falls below the threshold to enter light load, EAOL (FIG. 13B), for a pre-determined number of switching cycles, counter circuitry 198 drives the Enter Light Load signal high, at time ta (FIG. 13B), setting S/R flip-flops FF1 and FF2. Following time ta, the Light Load signal output of FF1 causes signal selector 170 to clamp the comparator input signal, Ec, to EAOPS (FIG. 13B). EAOPS will determine the HS ON time during operation in PSDCM under light load. When FF2 is set, the HS Disable signal goes low, preventing switch HS from being turned ON. At the start of each operating period, the output voltage is sampled (Sampled $V_{out}$ signal, FIG. 12) and compared to the nominal $V_{out}$ (Vnom, FIG. 12) by comparator COMP2 194. When $V_{out}$ drops below Vnom, e.g., at time tc (FIG. 13C), the output of COMP2 goes high, resetting FF2 until the beginning of the next cycle and enabling HS to turn ON. The pulse of energy following tc (FIG. 13D) raises $V_{out}$ above Vnom; thereafter the converter skips pulses until $V_{out}$ once again falls below Vnom, at, e.g., time td.

The controller exits PSDCM when the number of skipped pulses is less than a predetermined minimum. To test for this condition, an HS ON PULSE resets counter U4 180 each time switch HS turns on. Thereafter, the counter 180 is incremented by START during each new operating period. If the counter reaches the predetermined count before HS is turned ON, the converter remains in PSDCM and counter U4 180 is reset the next time HS turns ON. If HS turns ON again before the counter reaches its limit, the output of AND gate 184 will go high, FF1 190 will be reset, and the converter will exit PSDCM. Delay block U1 182 delays reset of U4 until the Q1 ON PULSE has ended to prevent exiting PSDCM when the counter is being reset.

OR gate U3 188 resets FF1 190 to end light load operation if $V_{out}$ falls below undervoltage threshold Vuvt. The Vuvt threshold enables the converter to leave light load immediately if the light load current capability of the converter may be exceeded.

Figure 17:
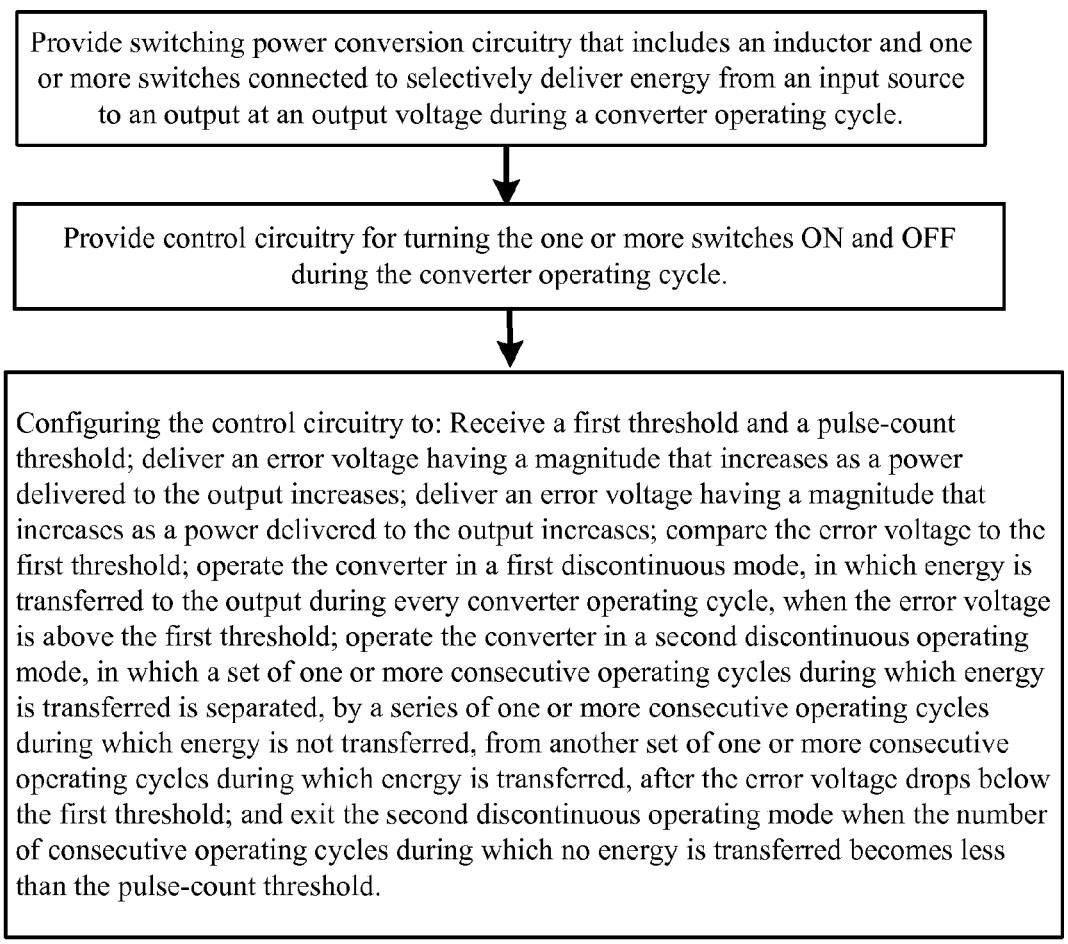
FIGS. 17 and 18 are flow diagrams of exemplary processes for controlling power conversion circuitry.

FIG. 17 shows an exemplary process for controlling power conversion circuitry. The process includes providing switching power conversion circuitry that includes an inductor and one or more switches connected to selectively deliver energy from an input source to an output at an output voltage during a converter operating cycle. The process includes providing control circuitry for turning the one or more switches ON and OFF during the converter operating cycle. The process includes configuring the control circuitry to: Receive a first threshold and a pulse-count threshold; deliver an error voltage having a magnitude that increases as a power delivered to the output increases; deliver an error voltage having a magnitude that increases as a power delivered to the output increases; compare the error voltage to the first threshold; operate the converter in a first discontinuous mode, in which energy is transferred to the output during every converter operating cycle, when the error voltage is above the first threshold; operate the converter in a second discontinuous operating mode, in which a set of one or more consecutive operating cycles during which energy is transferred is separated, by a series of one or more consecutive operating cycles during which energy is not transferred, from another set of one or more consecutive operating cycles during which energy is transferred, after the error voltage drops below the first threshold; and exit the second discontinuous operating mode when the number of consecutive operating cycles during which no energy is transferred becomes less than the pulse-count threshold.

Figure 18:
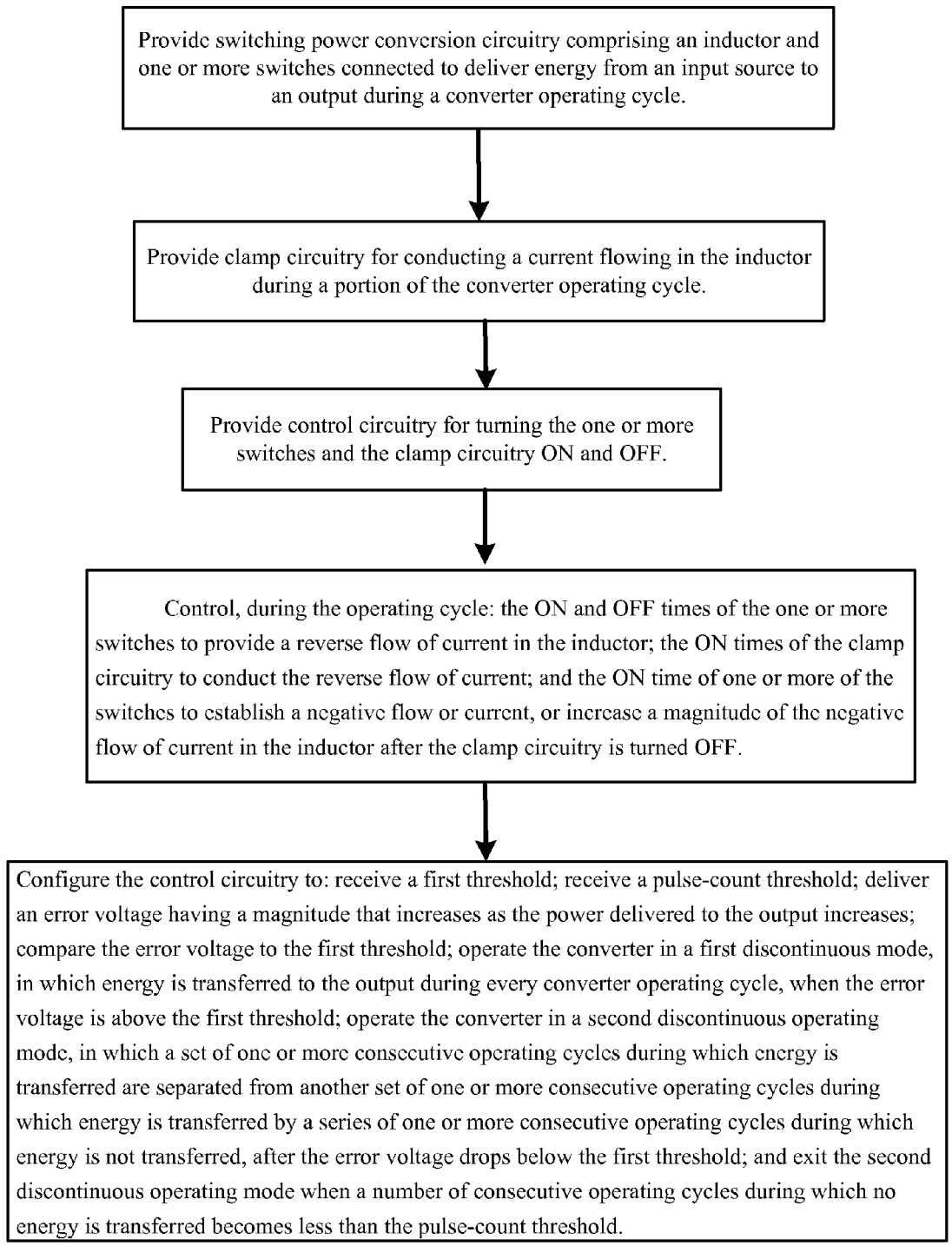

FIG. 18 shows an exemplary process for controlling power conversion circuitry. The process includes providing switching power conversion circuitry including an inductor and one or more switches connected to deliver energy from an input source to an output during a converter operating cycle; providing clamp circuitry for conducting a current flowing in the inductor during a portion of the converter operating cycle; and providing control circuitry for turning the one or more switches and the clamp circuitry ON and OFF. The process includes controlling, during the operating cycle: the ON and OFF times of the one or more switches to provide a reverse flow of current in the inductor; the ON times of the clamp circuitry to conduct the reverse flow of current; and the ON time of one or more of the switches to establish a negative flow or current, or increase a magnitude of the negative flow of current in the inductor after the clamp circuitry is turned OFF. The process includes configuring the control circuitry to: receive a first threshold; receive a pulse-count threshold; deliver an error voltage having a magnitude that increases as the power delivered to the output increases; compare the error voltage to the first threshold; operate the converter in a first discontinuous mode, in which energy is transferred to the output during every converter operating cycle, when the error voltage is above the first threshold; operate the converter in a second discontinuous operating mode, in which a set of one or more consecutive operating cycles during which energy is transferred are separated from another set of one or more consecutive operating cycles during which energy is transferred by a series of one or more consecutive operating cycles during which energy is not transferred, after the error voltage drops below the first threshold; and exit the second discontinuous operating mode when a number of consecutive operating cycles during which no energy is transferred becomes less than the pulse-count threshold.

Other embodiments are within the scope of the following claims.

What is claimed is:

1. Apparatus comprising a switching power converter comprising:
   an input for receiving energy from a source;
   an output;
   an inductor and one or more switches connected to deliver energy from the input to the output during a succession of converter operating cycles;
   clamp circuitry connected to conduct a current flowing in the inductor to trap energy in the inductor; and
   a controller adapted to control conductivity of the one or more switches and the clamp circuitry;
   wherein the clamp circuitry comprises a first clamp switch and a second clamp switch connected in series, an end of the first clamp switch connected to a first end of the inductor, an end of the second clamp switch connected to a second end of the inductor, the clamp circuitry configured to form a short circuit between the first end of the inductor and the second end of the inductor when the clamp circuitry is controlled to be conductive, and form an open circuit between the first end of the inductor and the second end of the inductor, to block a voltage of either polarity, when the clamp circuitry is controlled to be non-conductive; and
   wherein the controller is configured to control the clamp circuitry to be conductive, forming a short circuit between the first end of the inductor and the second end of the inductor, at a time when a non-zero reverse current is flowing in the inductor to trap energy in the inductor, and, thereafter, control the clamp circuitry to be non-conductive before the reverse current decays to zero to allow energy trapped in the inductor to charge and discharge capacitances associated with at least one of the one or more switches in the converter.

2. Apparatus comprising
   a switching power converter, comprising:
   an input for receiving energy from a source;
   an output;
   an inductor having an inductor input and an inductor output;
   one or more switches connected to transfer energy forward from the input to the output via the inductor; and
   clamp circuitry having a first clamp terminal connected to the inductor input, a second clamp terminal connected to the inductor output, a first clamp switch and a second clamp switch connected in series between the first and second clamp terminals, the first and second clamp switches each having a control input, the clamp circuitry being configured and arranged to:
      (a) form a short circuit between the inductor input and the inductor output, conducting current unidirectionally from the first clamp terminal to the second clamp terminal with the first clamp switch ON;
      (b) form a short circuit between the inductor input and the inductor output, conducting current unidirectionally from the second clamp terminal to the first clamp terminal with the second clamp switch ON;
      (c) form a short circuit between the inductor input and the inductor output, conducting current bi-directionally between the first and second clamp terminals with both of the first and second clamp switches ON; and
      (d) block current in both directions between the first and second clamp terminals with both of the first and second clamp switches OFF; and
   a controller adapted to operate the switching power converter in a series of converter operating cycles including:
      an energy transfer phase during which the one or more switches are operated to transfer energy from the input to the inductor and from the inductor to the output, the energy transfer phase being characterized by a positive current flowing in the inductor and a reversal in polarity of a voltage across the inductor; and
      a clamp phase during which the first and second clamp switches are operated to conduct a negative flow of inductor current, including: (i) turning one of the first or second clamp switches ON after the voltage across the inductor reverses polarity during the energy transfer phase and before the beginning of the clamp phase, and (ii) turning the other of the first or second clamp switches OFF after the end of the clamp phase and before the voltage across the inductor reverses polarity again.

3. The apparatus of claim 1 or claim 2 wherein both of the first and second clamp switches are MOSFETs.

4. The apparatus of claim 1 or claim 2 wherein at least one of the first clamp switch or the second clamp switch comprises a controllable switch connected across a diode.

5. The apparatus of claim 1 wherein the switching power converter is a buck converter.

6. The apparatus of claim 1 wherein the energy transfer from the inductor to the output overlaps in time with the energy transfer from the input to the inductor and the power converter functions as a buck converter.

7. The apparatus of claim 1 wherein the switching power converter is a boost converter.

8. The apparatus of claim 1 wherein the energy transfer from the inductor to the output does not overlap in time with the energy transfer from the input to the inductor and the switching power converter functions as a boost converter.

9. The apparatus of claim 1 wherein the controller is configured to:
control the one or more switches to transfer energy from the input to the output in a series of converter operating cycles, the transfer of energy associated with a positive flow of inductor current; and
control the clamp circuitry to conduct a negative inductor current during a clamp phase of the operating cycle.

10. The apparatus of claim 1 wherein the controller is further adapted to selectively operate the one or more switches to establish a negative flow of current, or increase a magnitude of the negative flow of current in the inductor after the clamp circuitry is turned OFF.

11. The apparatus of claim 1 or claim 9 wherein the negative flow of current or a negative flow of current provides a reduction in a voltage across a non-conductive switch after the clamp circuitry is turned OFF.

12. The apparatus of claim 4 wherein the controllable switch is a bipolar transistor.

13. The apparatus of claim 1 or claim 2 wherein at least one of the first clamp switch or the second clamp switch is a MOSFET.

14. A method comprising:
providing switching power conversion circuitry comprising an inductor and one or more switches connected to selectively deliver energy from an input source to an output at an output voltage during a converter operating cycle;
providing control circuitry for turning the one or more switches ON and OFF during the converter operating cycle; and
configuring the control circuitry to:
receive a first threshold;
receive a pulse-count threshold;
deliver an error voltage having a magnitude that increases as a power delivered to the output increases;
compare the error voltage to the first threshold;
operate the converter in a first discontinuous mode, in which energy is transferred to the output during every converter operating cycle, when the error voltage is above the first threshold;
operate the converter in a second discontinuous operating mode, in which a set of one or more consecutive operating cycles during which energy is transferred is separated, by a series of one or more consecutive operating cycles during which energy is not transferred, from another set of one or more consecutive operating cycles during which energy is transferred, after the error voltage drops below the first threshold; and
exit the second discontinuous operating mode when the number of consecutive operating cycles during which no energy is transferred becomes less than the pulse-count threshold.

15. The method of claim 14 further comprising:
providing clamp circuitry for conducting inductor current during a clamp phase of an operating cycle.

16. The method of claim 14 further comprising:
configuring the control circuitry to:
receive a second threshold;
compare a converter output voltage to the second threshold; and
exit the second discontinuous operating mode when the output voltage drops below the second threshold.

17. The method of claim 15 further comprising:
configuring the control circuitry to selectively operate the one or more switches to establish a negative flow of current, or increase a magnitude of the negative flow of current in the inductor after the clamp circuitry is turned OFF.

18. A method comprising:
providing switching power conversion circuitry comprising an inductor and one or more switches connected to deliver energy from an input source to an output during a converter operating cycle to conduct a current flowing in the inductor to trap energy in the inductor;
providing clamp circuitry to establish a short circuit across the inductor during a portion of the converter operating cycle;
providing control circuitry for turning the one or more switches and the clamp circuitry ON and OFF; and
controlling, during the operating cycle:
the ON and OFF times of the one or more switches to provide a reverse flow of current in the inductor;
the ON times of the clamp circuitry to establish the short circuit across the inductor, conducting the reverse flow of current in the short circuit; and
the ON time of one or more of the switches to establish a negative flow of current, or increase a magnitude of the negative flow of current in the inductor after the clamp circuitry is turned OFF.

19. The method of claim 14 or 18 in which providing switching power conversion circuitry comprises providing buck converter circuitry.

20. The method of claim 14 or 18 in which providing switching power conversion circuitry comprises providing boost converter circuitry.

21. The method of claim 15 or claim 18 in which providing clamp circuitry comprises:
providing clamp circuitry having a first clamp terminal connected to an input end of the inductor, a second clamp terminal connected to an output end of the inductor, a first clamp switch and a second clamp switch connected in series between the first and second clamp terminals, the first and second clamp switches each having a control input, the clamp circuitry being configured and arranged to:
(a) conduct current uni-directionally from the first clamp terminal to the second clamp terminal with the first clamp switch ON;
(b) conduct current uni-directionally from the second clamp terminal to the first clamp terminal with the second clamp switch ON;
(c) conduct current bi-directionally between the first and second clamp terminals with both of the first and second clamp switches ON; and (d) block current in both directions between the first and second clamp terminals with both of the first and second clamp switches OFF.

22. The method of claim 18 further comprising:
configuring the control circuitry to:
receive a first threshold;
receive a pulse-count threshold;
deliver an error voltage having a magnitude that increases as the power delivered to the output increases;
compare the error voltage to the first threshold;
operate the converter in a first discontinuous mode, in which energy is transferred to the output during every converter operating cycle, when the error voltage is above the first threshold;
operate the converter in a second discontinuous operating mode, in which a set of one or more consecutive operating cycles during which energy is transferred are separated from another set of one or more consecutive operating cycles during which energy is transferred by a series of one or more consecutive operating cycles during which energy is not transferred, after the error voltage drops below the first threshold; and
exit the second discontinuous operating mode when a number of consecutive operating cycles during which no energy is transferred becomes less than the pulse-count threshold.

23. The method of claim 21 further comprising:
configuring the control circuitry to:
control the ON and OFF times of the one or more switches to transfer energy from the input to the inductor and from the inductor to the output during an energy transfer phase, the energy transfer phase being characterized by a positive flow of current in the inductor and a reversal in polarity of a voltage across the inductor;
control the ON and OFF times of the first and second clamp switches to conduct a negative flow of inductor current during a clamp phase of the operating cycle;
turn one or the other of the first and second clamp switches ON after the voltage across the inductor reverses polarity during the energy transfer phase and before the beginning of the clamp phase; and
turn the other of the first and second clamp switches OFF after the end of the clamp phase and before the voltage across the inductor reverses polarity again.

24. The method of claim 22 further comprising:
configuring the control circuitry to:
receive a second threshold;
compare a converter output voltage to the second threshold; and
exit the second discontinuous operating mode when the output voltage drops below the second threshold.

25. A method comprising:
providing switching power conversion circuitry comprising:
an input for receiving energy from an input source;
an output;
an inductor having an inductor input and an inductor output; and
one or more switches connected to transfer energy from the input to the output via the inductor;
providing clamp circuitry having a first clamp terminal connected to the inductor input, a second clamp terminal connected to the inductor output, a first clamp switch and a second clamp switch connected in series between the first and second clamp terminals, the first and second clamp switches each having a control input, the clamp circuitry being configured and arranged to:
(a) form a short circuit between the inductor input and the inductor output, conducting current uni-directionally from the first clamp terminal to the second clamp terminal with the first clamp switch ON;
(b) form a short circuit between the inductor input and the inductor output, conducting current uni-directionally from the second clamp terminal to the first clamp terminal with the second clamp switch ON;
(c) form a short circuit between the inductor input and the inductor output, conducting current bi-directionally between the first and second clamp terminals with both of the first and second clamp switches ON; and
(d) block current in both directions between the first and second clamp terminals with both of the first and second clamp switches OFF;
providing a controller for controlling the conductivity of the one or more switches and the first and second clamp switches in a series of converter operating cycles; and
configuring the controller to:
control the conductivity of the one or more switches to transfer energy from the input to the inductor and from the inductor to the output during an energy transfer phase, the energy transfer phase being characterized by a positive flow of current in the inductor and a reversal in polarity of a voltage across the inductor;
control the conductivity of the first and second clamp switches to conduct a negative flow of inductor current during a clamp phase of the operating cycle;
turn one or the other of the first and second clamp switches ON after the voltage across the inductor reverses polarity during the energy transfer phase and before the beginning of the clamp phase; and
turn the other of the first and second clamp switches OFF after the end of the clamp phase and before the voltage across the inductor reverses polarity again.

26. The method of claim 25 wherein the energy transfer from the inductor to the output overlaps in time with the energy transfer from the input to the inductor and providing switching power conversion circuitry comprises providing a buck converter.

27. The method of claim 25 wherein the energy transfer from the inductor to the output does not overlap in time with the energy transfer from the input to the inductor and providing switching power conversion circuitry comprises providing a boost converter.

28. Apparatus comprising a switching power converter comprising:
an input for receiving energy from a source;
an output;
an inductor and one or more switches connected to deliver energy from the input to the output during a succession of converter operating cycles;
clamp circuitry connected to conduct a current flowing in the inductor to trap energy in the inductor; and
a controller adapted to control conductivity of the one or more switches and the clamp circuitry;
wherein the clamp circuitry comprises a first clamp switch and a second clamp switch connected in series, an end of the first clamp switch connected to a first end of the inductor, an end of the second clamp switch connected to a second end of the inductor, the clamp circuitry configured to form a short circuit between the first end of the inductor and the second end of the inductor when the clamp circuitry is controlled to be conductive, and form an open circuit between the first end of the inductor and the second end of the inductor, to block a voltage of either polarity, when the clamp circuitry is controlled to be non-conductive;

wherein the controller is configured to control the clamp circuitry to be conductive, forming a short circuit between the first end of the inductor and the second end of the inductor, at a time when a non-zero reverse current is flowing in the inductor to trap energy in the inductor, and, thereafter, control the clamp circuitry to be non-conductive to allow energy trapped in the inductor to charge and discharge capacitances in the converter; and wherein the controller is configured to:
- control the one or more switches to transfer energy from the input to the output in a series of converter operating cycles, the transfer of energy associated with a positive flow of inductor current, and
- control the clamp circuitry to conduct a negative inductor current during a clamp phase of the operating cycle.

* * * * *